US012812629B2

(12) United States Patent
Chin et al.

(10) Patent No.: US 12,812,629 B2
(45) Date of Patent: Nov. 24, 2026

(54) METHOD OF UPLINK RESOURCE ALLOCATION AND USER EQUIPMENT THEREOF

(71) Applicant: SHARP KABUSHIKI KAISHA, Sakai City (JP)

(72) Inventors: Heng-Li Chin, Taipei City (TW); Hsin-Hsi Tsai, Taipei City (TW)

(73) Assignee: SHARP KABUSHIKI KAISHA, Sakai City (JP)

( * ) Notice: Subject to any disclaimer, the term of this patent is extended or adjusted under 35 U.S.C. 154(b) by 92 days.

(21) Appl. No.: 18/180,142

(22) Filed: Mar. 8, 2023

(65) Prior Publication Data

US 2023/0292314 A1 Sep. 14, 2023

Related U.S. Application Data

(60) Provisional application No. 63/319,211, filed on Mar. 11, 2022.

(51) Int. Cl.
*H04W 72/1268* (2023.01)
*H04W 76/28* (2018.01)

(52) U.S. Cl.
CPC ....... *H04W 72/1268* (2013.01); *H04W 76/28* (2018.02)

(58) Field of Classification Search
CPC . H04W 72/1268; H04W 76/28; H04W 72/02; H04W 72/115; H04W 72/0453
See application file for complete search history.

(56) References Cited

U.S. PATENT DOCUMENTS

2015/0237648 A1* 8/2015 Zhang .................. H04W 72/23 370/329
2019/0132862 A1* 5/2019 Jeon ...................... H04L 5/0098
2019/0349974 A1* 11/2019 Sundararajan .... H04W 72/1268
2020/0267755 A1* 8/2020 Ugurlu .............. H04W 72/0453
2020/0344632 A1* 10/2020 Li ..................... H04W 28/0252
2020/0396044 A1* 12/2020 Lee ....................... H04L 47/765
2021/0153176 A1* 5/2021 Lee ......................... H04W 4/40
2021/0243795 A1* 8/2021 Kuo ...................... H04W 72/23
2022/0217713 A1* 7/2022 Lei .................... H04W 72/0453
2022/0264608 A1* 8/2022 Bae ....................... H04L 1/0072
2023/0075481 A1* 3/2023 Mu ....................... H04W 72/23

(Continued)

OTHER PUBLICATIONS

A. Gunturu, V. S. Tijoriwala and A. K. Reddy Chavva, "Optimal Configured Grant Selection Method for NR Rel-16 Uplink URLLC," GLOBECOM 2020—2020 IEEE Global Communications Conference, Taipei, Taiwan, 2020, pp. 1-6. (Year: 2020).*

(Continued)

*Primary Examiner* — Thomas R Cairns
*Assistant Examiner* — Raenita Ann Fenner
(74) *Attorney, Agent, or Firm* — ScienBiziP, P.C.

(57) ABSTRACT

A method of uplink resource allocation and a user equipment are provided. The method includes: receiving a configuration and the configuration contains at least one configured uplink grant configuration; selecting one of the at least one configured uplink grant configuration in response to a trigger event; determining an uplink resource according to the selected configured uplink grant configuration; and transmitting pending uplink data via the uplink resource.

12 Claims, 5 Drawing Sheets

(56) References Cited

U.S. PATENT DOCUMENTS

| | | | | |
|---|---|---|---|---|
| 2023/0100816 | A1* | 3/2023 | Tijoriwala | H04W 72/23 370/330 |
| 2023/0164773 | A1* | 5/2023 | Alfarhan | H04W 72/52 370/329 |
| 2023/0209504 | A1* | 6/2023 | Agiwal | H04W 68/02 455/458 |
| 2023/0337269 | A1* | 10/2023 | Rao | H04B 7/0695 |
| 2025/0097822 | A1* | 3/2025 | Christoffersson | H04W 72/1268 |

OTHER PUBLICATIONS

Qualcomm, "Revised SID on XR Evaluations for NR", 3GPP TSG RAN Meeting #91e, RP-210460, Mar. 16-26, 2021, pp. 1-6.

3GPP, "3rd Generation Partnership Project; Technical Specification Group Radio Access Network; NR; Medium Access Control (MAC) protocol specification (Release 16)", 3GPP TS 38.321 V16.7.0, Dec. 2021, pp. 1-158.

3GPP, "3rd Generation Partnership Project; Technical Specification Group Radio Access Network; NR; Physical layer procedures for data (Release 17)", 3GPP TS 38.214 V17.0.0, Dec. 2021, pp. 1-217.

3GPP, "3rd Generation Partnership Project; Technical Specification Group Radio Access Network; NR; Radio Resource Control (RRC) protocol specification (Release 16)", 3GPP TS 38.331 V16.7.0, Dec. 2021, pp. 1-963.

3GPP, "3rd Generation Partnership Project; Technical Specification Group Radio Access Network; NR; Physical layer procedures for control (Release 17)", 3GPP TS 38.213 V17.0.0, Dec. 2021, pp. 1-225.

* cited by examiner

METHOD OF UPLINK RESOURCE ALLOCATION AND USER EQUIPMENT THEREOF

CROSS-REFERENCE TO RELATED APPLICATION(S)

The present application claims the benefit of and priority to U.S. Provisional Patent Application Ser. No. 63/319,211, filed on Mar. 11, 2022, entitled "METHOD AND APPARATUS TO HANDLE TRANSMISSION OF XR DEVICES", the content of which is hereby incorporated fully by the reference herein into the present disclosure.

FIELD

The present disclosure generally relates to wireless communications, and more particularly, to a method of uplink resource allocation and a user equipment (UE) thereof.

BACKGROUND

With the tremendous growth in the number of connected devices and the rapid increase in user/network traffic volume, various efforts have been made to improve different aspects of wireless communication for the next-generation wireless communication system, such as the fifth generation (5G) New Radio (NR), by improving data rate, latency, reliability, and mobility. The 5G NR system is designed to provide flexibility and configurability to optimize the network services and types, accommodating various use cases, such as enhanced Mobile Broadband (eMBB), massive Machine-Type Communication (mMTC), and Ultra-Reliable and Low-Latency Communication (URLLC).

On Extended Reality (XR) and Cloud Gaming traffic with high throughput, low latency, and high reliability requirements, it is important to consider the capacity of these services over 5G networks. One way to represent the capacity of the XR and Cloud Gaming services is via the number of users who can simultaneously consume the service under given traffic requirements and for a given deployment scenario (e.g., Urban Macro, Indoor Hotspot) with some density of 5G cells. If the traffic requirements of the XR and Cloud Gaming service are flexible (e.g., the underlying architecture allows adaptation of content), then the capacity of the service can be studied by assessing the delay, throughput, and reliability variations with increasing number of users in the system, as specified in "RP-210460; Revised SID on XR Evaluations for NR".

In either case, when the latency is low and the reliability requirements are high, two effects come into play: (a) The burst throughput of the traffic measured over a time range that corresponds to the latency requirement, and extracted at the percentile represented by the reliability requirement, can be significantly higher than the average throughput requirement. For example, the average throughput requirement of an XR traffic can be 100 Mbps, but its burst throughput requirement over short measurement windows can be 300 Mbps while also requiring high reliability. (b) The short-term throughput experienced by a UE measured a time range that corresponds to the latency requirement and extracted at the percentile represented by the reliability requirement, can be significantly lower than the average throughput experienced by that UE.

These effects can significantly impact the capacity of XR services over a 5G network. Therefore, it is important to study capacity aspects for XR and cloud gaming, including key performance indicators (KPIs) that represent XR and Cloud Gaming services over 5G.

As such, capacity is an important factor for XR and Cloud Gaming.

SUMMARY

The present disclosure is directed to a method of uplink resource allocation and a user equipment (UE) thereof.

The disclosure provides a method of uplink resource allocation, performed by a user equipment (UE), wherein the method including: receiving a configuration and the configuration contains at least one configured uplink grant configuration; selecting one of the at least one configured uplink grant configuration in response to a trigger event; determining an uplink resource according to the selected configured uplink grant configuration; and transmitting pending uplink data via the uplink resource.

In one embodiment, the step of selecting the one of the at least one configured uplink grant configuration including at least one of the followings: switching from a first parameter value to a second parameter value; activating, deactivating, releasing, initializing, or reinitializing the at least one configured uplink grant configuration configured to the UE; switching from a first bandwidth part (BWP) to a second BWP; and/or activating or deactivating a serving cell configured to the UE.

In one embodiment, the trigger event including: receiving a switching indication from a network by the UE.

In one embodiment, the trigger event including: an amount of the pending uplink data being greater than a threshold.

In one embodiment, the trigger event including: a timer expiring.

In one embodiment, the trigger event including at least one of the followings: a timer being started; a timer being restarted; and a timer being running.

In one embodiment, the trigger event including: a timer being not running.

In one embodiment, the trigger event including: a downlink channel quality measured by the UE being greater than a threshold.

In one embodiment, the trigger event including: determining, by the UE, uplink data of the UE becomes available for transmission.

In one embodiment, the trigger event including: receiving a downlink assignment by the UE.

In one embodiment, the trigger event including at least one of the followings: entering a discontinuous reception (DRX) active time by the UE; and leaving a DRX active time by the UE.

In one embodiment, the trigger event including: transmitting information to a base station by the UE.

In one embodiment, the trigger event including: performing a procedure for an extended reality (XR) service by the UE.

In one embodiment, the trigger event including: the UE operates on a preconfigured discontinuous reception (DRX) cycle.

The disclosure provides a user equipment, including: one or more non-transitory computer-readable media having computer-executable instructions embodied thereon; and at least one processor coupled to the one or more non-transitory computer-readable media, and configured to execute the computer-executable instructions to: receiving a configuration and the configuration contains at least one configured uplink grant configuration; selecting one of the at least one configured uplink grant configuration in response to a trigger event; determine an uplink resource according to the selected configured uplink grant configuration; and transmit pending uplink data via the uplink resource.

In view of foregoing, the present disclosure may allocate the uplink resource for the UE based on a trigger event.

BRIEF DESCRIPTION OF THE DRAWINGS

Aspects of the exemplary disclosure are best understood from the following detailed description when read with the accompanying figures. Various features are not drawn to scale, and dimensions of various features may be arbitrarily increased or reduced for clarity of discussion.

DETAILED DESCRIPTION

Figure 1:
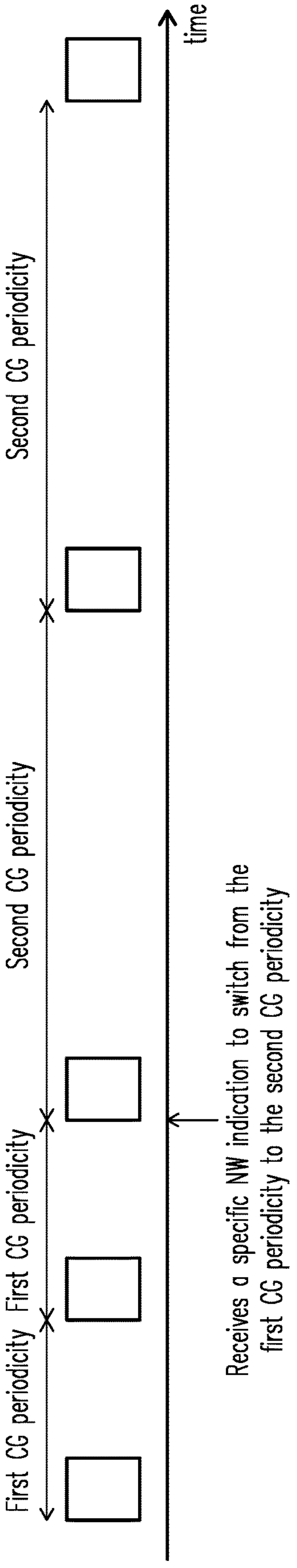
FIG. 1 is a schematic diagram illustrating a switching between parameter values within a parameter set via a specific NW indication, according to an example implementation of the present disclosure.

The acronyms in the present disclosure are defined as follows and unless otherwise specified, the acronyms have the following meanings:

| Acronym | Full name |
|---|---|
| AS | Access Stratum |
| BS | Base Station |
| BWP | Bandwidth Part |
| CBRA | Contention-based Random Access |
| CCCH | Common Control Channel |
| CE | Control Element |
| CG | Configured Uplink Grant |
| CN | Core Network |
| CORESET | Control Resource Set |
| C-RNTI | Cell-Radio Network Temporary Identifier |
| CSI | Channel State Information |
| CS-RNTI | Configured Scheduling-Radio Network Temporary Identifier |
| CSS | Common Search Space |
| DCI | Downlink Control Information |
| DL | Downlink |
| DRB | Data Radio Bearer |
| DRX | Discontinuous Reception |
| HARQ | Hybrid Automatic Repeat Request |
| IE | Information Elements |
| I-RNTI | Inactive- Radio Network Temporary Identifier |
| LCH | Logical Channel |
| LCG | Logical Channel Group |
| MAC | Medium Access Control |
| MCG | Master Cell Group |

-continued

| Acronym | Full name |
|---|---|
| NUL | Normal Uplink carrier |
| NW | Network |
| PCell | Primacy Cell |
| PDCCH | Physical Downlink Control Channel |
| PDCP | Packet Data Convergence Protocol |
| PDSCH | Physical Downlink Shared Channel |
| PHY | Physical Layer |
| PRACH | Physical Random Access Channel |
| PS | Power Saving |
| PUCCH | Physical Uplink Control Channel |
| PUSCH | Physical Uplink Shared Channel |
| RA | Random Access |
| RAR | Random Access Response |
| RB | Radio Bearer |
| Rel | Release |
| RLC | Radio Link Control |
| RLF | Radio Link Failure |
| RNTI | Radio Network Temporary Identifier |
| RRC | Radio Resource Control |
| RSRP | Reference Signal Received Power |
| SCell | Secondary Cell |
| SCG | Secondary Cell Group |
| SDAP | Service Data Adaptation Protocol |
| SFN | System Frame Number |
| SPS | Semi-Persistent Scheduling |
| SR | Scheduling Request |
| SRB | Signaling Radio Bearer |
| SS | Search Space |
| TA | Timing Advance |
| TBS | Transport Block Size |
| SUL | Supplementary Uplink Carrier |
| UE | User Equipment |
| UL | Uplink |
| XR | Extended Reality |

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not shown) by the same numerals in the example figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to", which specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Any sentence, paragraph, (sub)-bullet, point, action, behavior, term, alternative, aspect, example, or claim described in the present disclosure may be combined logically, reasonably, and properly to form a specific method. Any sentence, paragraph, (sub)-bullet, point, action, behavior, term, alternative, aspect, example, or claim described in the present disclosure may be implemented independently and separately to form a specific method. Dependency, e.g., “based on”, “more specifically”, “in some implementations”, “in one alternative”, “in one example”, “in one aspect”, or etc., in the present disclosure is just one possible example in which would not restrict the specific method. One aspect of the present disclosure may be used, for example, in a communication, communication equipment (e.g., a mobile telephone apparatus, ad base station apparatus, a wireless LAN apparatus, and/or a sensor device, etc.), and integrated circuit (e.g., a communication chip) and/or a program, etc. According to any sentence, paragraph, (sub)-bullet, point, action, behavior, term, alternative, aspect, example, implementation, or claim described in the present disclosure, “X/Y” may include the meaning of “X or Y”. According to any sentence, paragraph, (sub)-bullet, point, action, behavior, term, alternative, aspect, example, implementation, or claim described in the present disclosure, “X/Y” may also include the meaning of “X and Y”. According to any sentence, paragraph, (sub)-bullet, point, action, behavior, term, alternative, aspect, example, implementation, or claim described in the present disclosure, “X/Y” may also include the meaning of “X and/or Y”.

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules which may be software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G NR Radio Access Network (RAN)) typically includes at least one base station, at least one UE, and one or more optional network elements that provide connection towards a network. The UE communicates with the network (e.g., a Core Network (CN), an Evolved Packet Core (EPC) network, an Evolved Universal Terrestrial Radio Access network (E-UTRAN), a 5G Core (5GC), or an internet), through a RAN established by one or more base stations.

It should be noted that, in the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A base station may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic wide-band-code division multiple access (W-CDMA), high-speed packet access (HSPA), LTE, LTE-A, eLTE (evolved LTE, e.g., LTE connected to 5GC), NR (often referred to as 5G), and/or LTE-A Pro. However, the scope of the present disclosure should not be limited to the above-mentioned protocols.

A base station may include, but is not limited to, a node B (NB) as in the UMTS, an evolved node B (eNB) as in the LTE or LTE-A, a radio network controller (RNC) as in the UMTS, a base station controller (BSC) as in the GSM/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the 5GC, a next-generation Node B (gNB) as in the 5G Access Network (5G-AN), and any other apparatus capable of controlling radio communication and managing radio resources within a cell. The BS may connect to serve the one or more UEs through a radio interface to the network.

The base station may be operable to provide radio coverage to a specific geographical area using a plurality of cells included in the RAN. The BS may support the operations of the cells. Each cell may be operable to provide services to at least one UE within its radio coverage. Specifically, each cell (often referred to as a serving cell) may provide services to serve one or more UEs within its radio coverage (e.g., each cell schedules the Downlink (DL) and optionally Uplink (UL) resources to at least one UE within its radio coverage for DL and optionally UL packet transmission). The BS may communicate with one or more UEs in the radio communication system through the plurality of cells.

A cell may allocate sidelink (SL) resources for supporting Proximity Service (ProSe) or Vehicle to Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be referred to as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resources may also be provided in an NR frame to support ProSe services, (E-UTRA/NR) sidelink services, or (E-UTRA/NR) V2X services.

In addition, the terms “system” and “network” herein may be used interchangeably. The term “and/or” herein is only an association relationship for describing associated objects, and represents that three relationships may exist. For example, A and/or B may indicate that: A exists alone, A and B exist at the same time, or B exists alone. In addition, the character “/” herein generally represents that the former and latter associated objects are in an “or” relationship.

As discussed above, the next-generation (e.g., 5G NR) wireless network is envisioned to support more capacity, data, and services. A UE configured with multi-connectivity may connect to a Master Node (MN) as an anchor and one or more Secondary Nodes (SNs) for data delivery. Each one of these nodes may be formed by a cell group that includes one or more cells. For example, a Master Cell Group (MCG) may be formed by an MN, and a Secondary Cell Group (SCG) may be formed by an SN. In other words, for a UE configured with dual connectivity (DC), the MCG is a set of one or more serving cells including the PCell and zero or more secondary cells. Conversely, the SCG is a set of one or more serving cells including the PSCell and zero or more secondary cells.

As also described above, the Primary Cell (PCell) may be an MCG cell that operates on the primary frequency, in which the UE either performs the initial connection establishment procedure or initiates the connection reestablishment procedure. In the MR-DC mode, the PCell may belong to the MN. The Primary SCG Cell (PSCell) may be an SCG cell in which the UE performs random access (e.g., when performing the reconfiguration with a sync procedure). In MR-DC, the PSCell may belong to the SN. A Special Cell (SpCell) may be referred to a PCell of the MCG, or a PSCell of the SCG, depending on whether the MAC entity is associated with the MCG or the SCG. Otherwise, the term Special Cell may refer to the PCell. A Special Cell may support a Physical Uplink Control Channel (PUCCH) transmission and contention-based Random Access (CBRA), and may always be activated. Additionally, for a UE in an RRC_CONNECTED state that is not configured with the CA/DC, may communicate with only one serving cell (SCell) which may be the primary cell. Conversely, for a UE in the RRC_CONNECTED state that is configured with the CA/DC a set of serving cells including the special cell(s) and all of the secondary cells may communicate with the UE.

Some terminologies are introduced first.

User Equipment (UE): The UE may be referred to as PHY/MAC/RLC/PDCP/SDAP entity. The PHY/MAC/RLC/PDCP/SDAP entity may be referred to the UE.

Network (NW): The NW may be a network node, a TRP, a cell (e.g., SpCell (Special Cell), PCell, PSCell, and/or SCell), a eNB, a gNB, and/or a base station.

Serving Cell: A PCell (Primary Cell), a PSCell, or an SCell (Secondary Cell). The serving cell may be an activated or a deactivated serving cell.

Special Cell (SpCell): For Dual Connectivity operation the term Special Cell refers to the PCell of the MCG (Master Cell Group) or the PSCell of the SCG (Secondary Cell Group) depending on if the MAC entity is associated to the MCG or the SCG, respectively. Otherwise, the term Special Cell refers to the PCell. A Special Cell supports PUCCH (Physical Uplink Control Channel) transmission and contention-based Random Access, and is always activated.

CG PUSCH: A CG PUSCH may be referred to as a PUSCH that corresponds to a CG configuration in the present disclosure.

XR device: A device that supports XR and/or cloud gaming service(s)/traffic(s). A UE as mentioned in the present disclosure may be referred to as a XR device.

Cloud gaming device: A device that supports cloud gaming and/or XR service(s)/traffic(s). A UE as mentioned in the present disclosure may be referred to as a cloud gaming device.

The PDCCH/CORESET/SS, mentioned in the present disclosure, may be one or more of the following options.

Option 1: Common Search Space such as: common search space(s) configured in PDCCH-ConfigCommon; the type-1 PDCCH CSS set configured by ra-SearchSpace; the type-3 PDCCH CSS set; search space zero; a new common Search Space set configured via system information (e.g., SIB) or RRC release message; or search space with parameters of the search space(s) configured in the initial BWP.

Option 2: UE-specific Search Space set such as: a UE-specific Search Space set configured via RRC Release message; a UE-specific Search Space set configured via Msg4/MsgB; a UE-specific search space set configured via PDCCH-Config; or a search space with ID other than 0-39.

The CORESET, mentioned in the present disclosure, may be one or more of the following options:

Option 1: common CORESET such as: CORESET 0; or CORESET other than CORESET 0.

Option 2: UE-specific CORESET configuration such as: a UE-specific CORESET configured via RRC Release message; a UE-specific CORESET configured via Msg4/MsgB; or a CORESET with ID other than 0-14.

In one implementation, the UE may perform at least one mechanism in the present disclosure only if it has at least one of the following specific UE characteristics:

Characteristic 1: the UE has a specific UE capability set. Preferably, the UE capability set includes one or more UE capabilities that indicates the support XR traffic requirements.

Characteristic 2: The UE is explicitly indicated by the NW that the UE is allowed to perform the at least one mechanism in the present disclosure.

Preferably, the UE may be explicitly indicated by the NW via a specific indication. The specific indication may be configured on a per CG configuration/BWP/cell/cell group/UE/entity basis. Here, an entity may be referred to as a PHY/MAC/RLC/PDCP/RRC entity.

In one example, the UE may be explicitly indicated by the NW that it is allowed to switch between two or multiple values within a parameter set(s) based on certain switching criteria. The UE may switch between two or multiple values of a parameter set(s) when one or multiple switching criteria are satisfied only if it is explicitly indicated by the NW.

In one example, the UE may be explicitly indicated by the NW that it is allowed to activate, deactivate, suspend, release, and/or (re-)initialize a CG configuration based on certain criteria. The UE activate, deactivate, suspend, and/or (re-)initialize a CG configuration based on the criteria defined in the present disclosure only if it is explicitly indicated by the NW.

In one example, the UE may be explicitly indicated by the NW that it is allowed to perform BWP switching and/or serving cell activation/deactivation based on certain criteria. The UE perform BWP switching and/or serving cell activation/deactivation based on the criteria defined in the present disclosure only if it is explicitly indicated by the NW.

In NR Rel-15 and Rel-16, the network can allocate uplink resources for the initial transmissions to UEs in RRC CONNECTED state via configured uplink grant, as specified in "RP-210460; Revised SID on XR Evaluations for NR" and "3GPP TS 38.214 V17.0.0; NR; Physical layer procedures for data". In general, there are two types of configured uplink grants.

Configured grant Type 1 where an uplink grant is provided by RRC, and stored as configured uplink grant.

Configured grant Type 2 where an uplink grant is provided by PDCCH, and stored or cleared as configured uplink grant based on L1 signalling indicating configured uplink grant activation or deactivation.

Type 1 and Type 2 are configured by RRC per Serving Cell and per BWP. Multiple configurations may be active simultaneously on the same serving cells/BWPs. For Type 2, activation and deactivation are independent among the Serving Cells. For the same Serving Cell/BWP, the MAC entity may be configured with both Type 1 or Type 2.

RRC configures the following parameters when the configured grant Type 1 is configured:

cs-RNTI: CS-RNTI for retransmission.

periodicity: periodicity of the configured grant Type 1.

timeDomainOffset: offset of a resource with respect to SFN=0 in time domain.

timeDomainAllocation: allocation of configured uplink grant in time domain which contains startSymbolAndLength (i.e. SLIV in "3GPP TS 38.214 V17.0.0; NR; Physical layer procedures for data").

nrofHARQ-Processes: the number of HARQ processes for configured grant.

RRC configures the following parameters when the configured grant Type 2 is configured:

cs-RNTI: CS-RNTI for retransmission.

periodicity: periodicity of the configured grant Type 2.

nrofHARQ-Processes: the number of HARQ processes for configured grant.

Upon configuration of a configured grant Type 1 for a Serving Cell by upper layers, the MAC entity shall: store the uplink grant provided by upper layers as a configured uplink grant for the indicated Serving Cell; or initialize or re-initialize the configured uplink grant to start in the symbol according to timeDomainOffset and S (derived from SLIV as specified in "3GPP TS 38.214 V17.0.0; NR; Physical layer procedures for data"), and to reoccur with periodicity.

Semi-Persistent Scheduling (SPS) is configured by RRC for a Serving Cell per BWP. Multiple assignments can be active simultaneously in the same BWP. Activation and deactivation of the DL SPS are independent among the Serving Cells.

For the DL SPS, a DL assignment is provided by PDCCH, and stored or cleared based on L1 signalling indicating SPS activation or deactivation.

RRC configures the following parameters when the SPS is configured:

cs-RNTI: CS-RNTI for activation, deactivation, and retransmission.

nrofHARQ-Processes: the number of configured HARQ processes for SPS.

harq-ProcID-Offset: offset of HARQ process for SPS.

periodicity: periodicity of configured downlink assignment for SPS.

When the SPS is released by upper layers, all the corresponding configurations shall be released.

After a downlink assignment is configured for SPS, the MAC entity shall consider sequentially that the Nth downlink assignment occurs in the slot for which:

$$(\text{numberOfSlotsPerFrame} \times \text{SFN} + \text{slot number in the frame}) = [(\text{numberOfSlotsPerFrame} \times \text{SFN}_{start\ time} + \text{slot}_{start\ time}) + N \times \text{periodicity} \times \text{numberOfSlotsPerFrame}/10] \text{ modulo } (1024 \times \text{numberOfSlotsPerFrame})$$

where $\text{SFN}_{start\ time}$ and $\text{slot}_{start}$ time are the SFN and slot, respectively, of the first transmission of PDSCH where the configured downlink assignment was (re-)initialized.

It should be noted that, in case of unaligned SFN across carriers in a cell group, the SFN of the concerned Serving Cell is used to calculate the occurrences of configured downlink assignments.

The BWP switching for a Serving Cell is used to activate an inactive BWP and deactivate an active BWP at a time. The BWP switching is controlled by the PDCCH indicating a downlink assignment or an uplink grant, by the bwp-Inactivity Timer, by RRC signalling, or by the MAC entity itself upon initiation of Random Access procedure or upon detection of consistent LBT failure on SpCell. Upon RRC (re-)configuration of firstActiveDownlinkBWP-Id and/or firstActiveUplinkBWP-Id for SpCell or activation of an SCell, the DL BWP and/or UL BWP indicated by firstActiveDownlinkBWP-Id and/or firstActiveUplinkBWP-Id respectively (as specified in "3GPP TS 38.331 V16.7.0; NR; Radio Resource Control (RRC) protocol specification") is active without receiving PDCCH indicating a downlink assignment or an uplink grant. The active BWP for a Serving Cell is indicated by either RRC or PDCCH (as specified in "3GPP TS 38.213 V17.0.0; NR; Physical layer procedures for control"). For unpaired spectrum, a DL BWP is paired with a UL BWP, and BWP switching is common for both UL and DL.

XR and/or cloud gaming services may have high throughput, low latency, and high-reliability requirements. Moreover, due to the characteristics of XR and/or cloud gaming traffics, UL data bursts may occasionally be encountered by an XR and/or cloud gaming device. It means the XR and/or cloud gaming device may expect a higher UL throughout during the period when UL data burst arrives. However, the existing UL scheduling mechanisms (e.g., the existing mechanism to configure/schedule UL resources (e.g., PUSCH) to an XR and/or cloud gaming device) may not be flexible enough. Hence, the existing UL scheduling mechanisms may not be timely enough to reflect the variation of UL XR traffics of an XR/cloud device. As a result, the NW may need to consistently provide or pre-allocate (e.g., configure) sufficient UL resource (e.g., PUSCH) for a XR and/or clouding gaming device. As such, the service requirement can be met when UL data burst arrives. In one example, the NW may need to configure a CG configuration to a XR and/or cloud gaming device with a specific TBS and/or periodicity, which accounts for UL data size during UL data burst periods. However, such a configuration may lead to resource wastage and reduced system capacity because the device does not require as much UL resource (e.g., PUSCH) outside the UL data burst period.

To solve the abovementioned issue, new mechanisms to improve the UL resource (e.g., PUSCH) scheduling/configuration flexibility may be introduced. The new UL resource scheduling/configuration mechanisms may provide UL resource (configurations) with different characteristics (e.g., TBS, periodicity, and/or transmission power, etc., of the UL resource) with enough quickness, which responds to the UL traffic condition of the XR and/or cloud gaming devices in a timely manner. With the new UL resource scheduling/configuration mechanisms, the NW may not need to consistently provide or pre-allocate (e.g., configure) UL resources to the XR and/or cloud gaming devices in the stringent manner. As such, the system capacity in the presence of XR and/or cloud gaming devices may be increased. Some new UL resource scheduling/configuration mechanisms may be found in the paragraphs below.

To improve the UL resource (e.g., PUSCH) scheduling/configuration flexibility, one or multiple parameter sets may be configured to a UE (with a specific UE characteristic(s)). Each parameter set may include two or multiple values of a certain parameter (i.e., CG configuration). The UE may receive a configuration including the parameter set from the NW.

The parameter set may be configured per LCH/RB, DRX configuration, DRX group, CG configuration, PUCCH/PUSCH configuration, BWP, cell, MAC entity, set/group of cells, and/or UE, etc.

The parameter set may be configured per LCH/RB (e.g., included in LogicalChannelConfig).

The parameter set may be configured per DRX configuration (e.g., included in DRX-Config and/or DRX-Config2 and/or a XR DRX configuration).

The parameter set may be configured per DRX group (e.g., included in secondatyDRX-GroupConfig and/or DRX-ConfigSecondaryGroup and/or a DRX group for XR).

The parameter set may be configured per CG configuration (e.g., included in ConfiguredGrantConfig).

The parameter set may be configured per PUCCH/PUSCH configuration (e.g., included in pusch-Config).

The parameter set may be configured per BWP (e.g., included in BWP-UplinkDedicated).

The parameter set may be configured per cell (e.g., included in SpCellConfig or SCellConfig).

The parameter set may be configured per MAC entity (e.g., included in MAC-CellGroupConfig).

The parameter set may be configured per set/group of cells.

More specifically, the UE may be configured with one or more set/group of cells.

More specifically, the set/group of cells may include one or more cells.

More specifically, the set/group of cells may include SpCell and/or SCell(s).

More specifically, the UE may be indicated that each cell is related to which set/group of cells.

More specifically, the set/group of cells may correspond to a specific Frequency Range (FR), e.g., FR1 and/or FR2.

More specifically, the set/group of cells may correspond to dormancy SCell group(s).

More specifically, the set/group of cells may be specifically configured for XR. The NW may configure the set/group of cells to be specifically for XR via a specific configuration/information element (IE).

The parameter set may correspond to an UL transmission, e.g., a PUSCH transmission.

The certain parameter may include (and not limited to) the following CG-related parameters: frequencyHopping, mcs-Table, mcs-TableTransformPrecoder, resourceAllocation, powerControlLoopTo Use, transformPrecoder, nrofHARQ-Processes, number of repetitions, repK-RV , configured grant periodicity, configuredGrantTimer, timeDomainOffset, timeDomainAllocation, frequencyDomainAllocation, precodingAndNumberOfLayers, srs-ResourceIndicator, TBS, frequencyHoppingOffset, pathlossReferenceIndex, pusch-RepTypeIndicator, frequencyHoppingPUSCH-RepTypeB, cg-RetransmissionTimer, cg-minDFI-Delay, cg-nrofPUSCH-InSlot, cg-nrofSlots, cg-COT-SharingOffset, betaOffsetsetCG-UCI, cg-COT-SharingList, harq-ProcID-Offset, harq-ProcID-Offset2, and/or phy-PriorityIndex, etc.

The certain parameter may include (and not limited to) the following PUSCH-related parameters: dataScramblingIdentityPUSCH, txConfig, frequencyHopping, frequencyHoppingOffsetLists, resourceAllocation, pusch-AggregationFactor, mcs-Table ENUMERATED, mcs-TableTransformPrecoder, transformPrecoder, codebookSubset, maxRank, minimumSchedulingOffsetK2, ul-AccessConfigListDCI-0-1 , harq-ProcessNumberSizeDCI-0-2, numberOfBitsForRV-DCI-0-2, INTEGER pusch-RepTypeA, pusch-RepTypeB, maxRankDCI-0-2, mcs-TableDCI-0-2, mcs-TableTransformPrecoderDCI-0-2, pusch-RepTypeIndicatorDCI-0-2, resourceAllocationDCI-0-2, resourceAllocationType 1 GranularityDCI-0-2 , pusch-TimeDomainAllocationListDCI-0-1, pusch-RepTypeIndicatorDCI-0-1, frequencyHoppingDCI-0-1, invalidSymbolPattern, ul-FullPowerTransmission, pusch-TimeDomainAllocationListForMultiPUSCH, and/or numberOfInvalidSymbolsForDL-UL-Switching, etc.

The certain parameter may include (and not limited to) the following LCH-related parameters. LCH priority, prioritisedBitRate, bucketSizeDuration, allowedServingCells, allowedSCS-List, maxPUSCH-Duration, configuredGrantType 1 Allowed, schedulingRequestID, logicalChannelSR-Mask, logicalChannelSR-DelayTimerApplied, bitRateQueryProhibitTimer, allowedCG-List, and/or allowedPHY-PriorityIndex, etc.

The parameter set may be configured by RRC configuration, and/or indicated by MAC CE, and/or DCI, etc.

The UE may select one of multiple parameter values in a parameter set(s) when one or multiple switching criteria (or trigger events) are satisfied. The UE may determine one or more uplink resources such as resources upon PUSCH, PUCCH, uplink control information (UCI), or PRACH according to the selected value and may transmit pending uplink data via the uplink resource after the uplink resource are determined.

In one implementation, the UE may select a parameter value from the multiple parameter values of the parameter set by switching from a parameter value to another parameter value. Specifically, the UE may switch or may be indicated to switch between two or multiple values of a parameter set(s) based on certain switching criteria (or trigger events). The UE may switch between two or multiple values of a parameter set(s) when one or multiple switching criteria (from criterion 1.1 through criterion 1.12 mentioned below) are satisfied.

Preferably, the one or multiple switching criteria may be defined based on the UL channel quality and/or the UE's UL traffic condition (e.g., the UE's UL traffic load). Alternatively, the one or multiple switching criteria may be satisfied when receiving a switching indication from the NW.

Preferably, the UE may send a specific indication to the NW when one or multiple switching criteria are satisfied. It is noted that a timer may be further configured by NW that UE will be prohibited to send another indication until the timer expires. The timer will start while UE sending the specific indication.

In one example, the UE may send a specific indication to the NW when at least one of criterion 1.2 to criterion 1.7 is satisfied.

In one example, the NW will send an acknowledgment in response to the reception of specific indication. The UE will perform the parameter value switching after receiving the successful acknowledgement from NW.

In one example, the specific indication may indicate the NW that the one or multiple switching criteria are satisfied. The indication may further comprise a switching cause.

In one example, the UE may switch the parameter value within the parameter set upon sending the specific indication to the NW.

In one example, the NW may allocate/reconfigure new parameter values, e.g., new CG-based parameters values, PUSCH-based parameter values, and/or LCH-based parameter values upon reception of the specific indication to the NW. The NW may allocate/reconfigure new parameter values via a specific switching indication as described in criterion 1.1.

In one example, the NW may send a specific switching indication to the UE, as is described in criterion 1.1, after receiving the specific indication from the UE. The specific switching indication may indicate the switch of parameter values within one or multiple parameter sets.

Criterion 1.1: The UE receives a specific switching indication from the NW.

Preferably, the specific switching indication may indicate the parameter value of a parameter set that the UE should switch to.

Preferably, the specific switching indication may have various format alternatives.

The specific switching indication may be included in a DCI, a MAC CE, and/or a RRC message, etc.

The specific switching indication may be a specific MAC CE, a DCI with a specific DCI format, and/or a specific RRC message, etc.

The specific switching indication may be received on a specific PDCCH/CORESET/SS. In one example, the specific PDCCH/CORESET/SS may be explicitly configured by the NW for transmitting scheduling information (e.g., DCI for DL assignment and/or UL grant) that schedules UL/DL resources for carrying XR traffics/services.

The specific switching indication may be a PDCCH addressed to a specific RNTI. In one example, the specific RNTI may be mapped to one or more XR services. In one example, the specific RNTI may be configured via the specific DRX configuration and/or a configuration for XR. In one example, the specific RNTI may be configured to the UE via RRC signaling. In one example, the specific RNTI may be associated with a DCI to schedule DL resource (e.g., PDSCH) and/or UL resource (e.g., PUSCH) including XR services. In one example, the specific RNTI may be associated with a DCI to preempt other UL/DL traffics.

Preferably, the specific switching indication may indicate the parameter value switching of one or more parameter sets from one or multiple BWPs/(set of) serving cells. Preferably, the specific switching indication may indicate the parameter value switching of one or more parameter sets that is configured in a different serving cell from the serving cell where the specific switching indication is received.

In one example, a UE is configured with BWP/serving cell 1, 2, and 3. Subsequently, the UE may, upon reception of the switching indication indicates parameter value switching of cell 1 and 2, performs parameter value switching of the parameter set(s) configured in or corresponds to cell 1 and 2. The UE may not perform parameter value switching of the parameter set(s) configured in or corresponds to cell 3. In another example, if UE receives a BWP switching commend or if a BWP timer expires, UE will discard/suspend the switching indication and relevant parameter value switching while UE doesn't receive the acknowledgement of the reception of switching indication from NW.

Preferably, the UE may start to apply the new parameter value, which is indicated by the specific switching indication, at a period after the reception of the specific switching indication. Moreover, the period may be preconfigured in the UE or may be configured/indicated by the NW.

Preferably, the UE may start to apply the new parameter value, which is indicated by the specific switching indication, after sending feedback to the NW.

The feedback may be sent to the NW in response to the received specific switching indication.

The feedback may be an (DCI-based/MAC CE-based) acknowledgment (ACK) to inform the NW that the specific switching indication has been successfully received by the UE.

Preferably, the UE may apply the new parameter value at a specific time after the reception of the specific switching indication.

The specific time may be the start of the next symbol, slot, subframe, SFN, DRX cycle, CG/SPS period, packet data unit (PDU) session, etc., after the reception of the specific switching indication.

Preferably, the UE may, upon reception of the specific switching indication, send feedback to the NW in response to the received specific switching indication. The feedback may be used to indicate that the switching indication has been successfully (or unsuccessfully) received by the UE.

In one example, a UE may be configured with a first parameter set for a CG configuration. The first parameter set may be a CG periodicity set for the corresponding CG configuration. The first parameter set may include two or multiple values of the corresponding parameter, e.g., a CG periodicity set including a first CG periodicity value and a second CG periodicity value. The NW may switch the CG periodicity value from the first CG periodicity value to the second CG periodicity value, or vice versa, via a specific switching indication. The specific switching indication may be included in a DCI and/or a MAC CE. The present example may be illustrated in FIG. 1. After receiving a specific NW indication to switch from the first CG periodicity to the second CG periodicity. The CG periodicity of the UE may be switched from the first CG periodicity to the second CG periodicity.

The mechanism introduced in the present example may also be applied to other PUSCH-related and/or CG-related parameters as listed above, e.g., TBS, repK, configuredGrantTimer, and/or cg-Retransmission Timer, etc.

In one example, a UE may be configured with a first parameter set for an LCH. The first parameter set may be an allowed-CG-List set for the corresponding CG configuration. The first parameter set may include two or multiple values of the corresponding parameter, e.g., an allowed-CG-List set including a first allowed-CG-List and a second allowed-CG-List. The NW may switch the allowed-CG-list of the LCH from the first allowed-CG-List to the second allowed-CG-List, or vice versa, via a specific switching indication. The specific switching indication may be included in a DCI and/or a MAC CE.

The mechanism introduced in the present example may also be applied to other LCH-related parameters as listed above, e.g., LCH priority, allowedServingCells, and/or allowedPHY-PriorityIndex, etc.

Criterion 1.2: The amount of pending UL data becomes larger/smaller than a data volume threshold.

Preferably, the data volume threshold may be preconfigured at the UE and/or may be configured by the NW.

Preferably, the data volume threshold may be configured per parameter set, per LCH/RB, CG configuration, PUCCH/PUSCH configuration, BWP, cell, MAC entity, set/group of cells, and/or UE, etc.

Preferably, the pending UL data may come from an LCH/LCG that is explicitly configured by the NW.

In one example, the LCH may be used to convey XR traffic.

In one example, the LCH/LCG may have a specific LCH/LCG ID.

Preferably, one or multiple data volume threshold may be configured at a UE. Each data volume threshold may be mapped to a parameter value within a parameter set. As such, the UE may switch to the parameter value that maps to the data volume threshold when the amount of pending UL data becomes larger/smaller than the corresponding data volume threshold.

Figure 2:
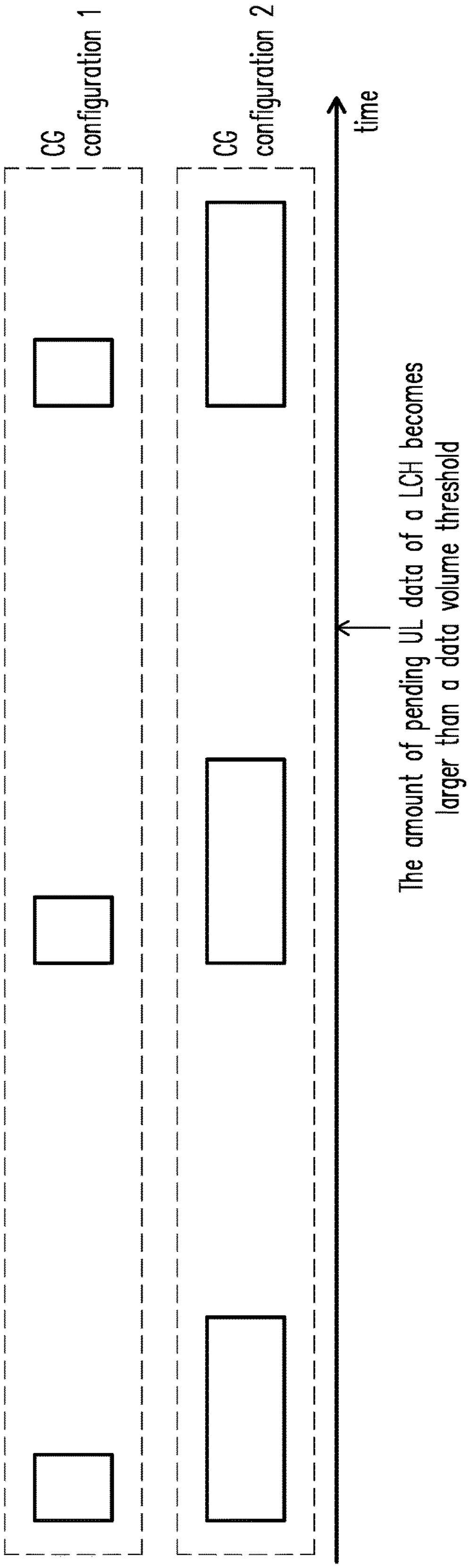
FIG. 2 is a schematic diagram illustrating a switching between parameter values within a parameter set via a data volume threshold, according to an example implementation of the present disclosure.

In one example, a UE may be configured with a data volume threshold and a first parameter set for an LCH. The first parameter set may be an allowed-CG-List set for the corresponding CG configuration. The first parameter set may include two or multiple values of the corresponding parameter, e.g., an allowed-CG-List set including a first allowed-CG-List and a second allowed-CG-List. Moreover, the first-allowed-CG-List includes CG configuration 1 and the second allowed-CG-List includes CG configuration 2. The UE may switch the allowed-CG-list of the LCH from the first allowed-CG-List (including CG configuration 1) to the second allowed-CG-List (including CG configuration 2) when the amount of pending UL data at the LCH becomes larger than the configured data volume threshold. Alternatively, The UE may switch the allowed-CG-list of the LCH from the second allowed-CG-List (including CG configuration 2) to the first allowed-CG-List (including CG configuration 1) when the amount of pending UL data at the LCH becomes smaller than the configured data volume threshold. The present example may be illustrated in FIG. 2. In response to the amount of pending UL data of a LCH becoming larger than a data volume threshold, the CG configuration of the UE may be switched from the first CG configuration to the second CG configuration.

Criterion 1.3: A specific timer/window expires.

Preferably, the value of the specific timer/window may be properly configured to align with the pattern of the UE's UL/DL traffic. As such, the parameter values within a parameter set may be changed according to the UE's UL/DL traffic.

Preferably, the specific timer/window may be considered as a timer to align with the pattern of the UE's UL/DL traffic.

Preferably, the specific timer may be configured per parameter set, per LCH/RB, CG configuration, PUCCH/PUSCH configuration, BWP, cell, MAC entity, set/group of cells, and/or UE, etc.

Preferably, the specific timer may be (re)started each time the UE switches the parameter value within the parameter set.

In one example, the specific timer/window may be (re) started again when the UE monitors/receives a specific switching indication (on PDCCH or PDSCH) (after expiration of the specific timer/window) and/or when the UE transmits feedback/ACK (on PUCCH) in response to the received specific switching indication (on PUCCH) (after expiration of the specific timer/window).

In one example, the specific timer/window may be (re) started again upon the UE applies the switching indication (after expiration of the specific timer/window).

In one example, the specific timer/window may be (re) started again at the next CG/PUSCH occasion after the UE switches the parameter set (after expiration of the specific timer/window).

Preferably, the specific timer may be stopped when at least one of the criteria from criterion 1.1 to criterion 1.12 is satisfied.

Preferably, when the specific timer expires, the UE may: switch to a default parameter value within a parameter set. The default parameter value may be configured by the NW (for each parameter set.); or switch to the parameter value within a parameter set before the latest parameter switching was performed.

Preferably, the timer may be referred to as a timer of a DRX configuration. The timer of a DRX configuration may be a drx-onDurationTimer, drx-InactivityTimer, drx-RetransmissionTimerDL, drx-Retransmission Timer UL, and/or drx-ShortCycleTimer, etc.

Figure 3:
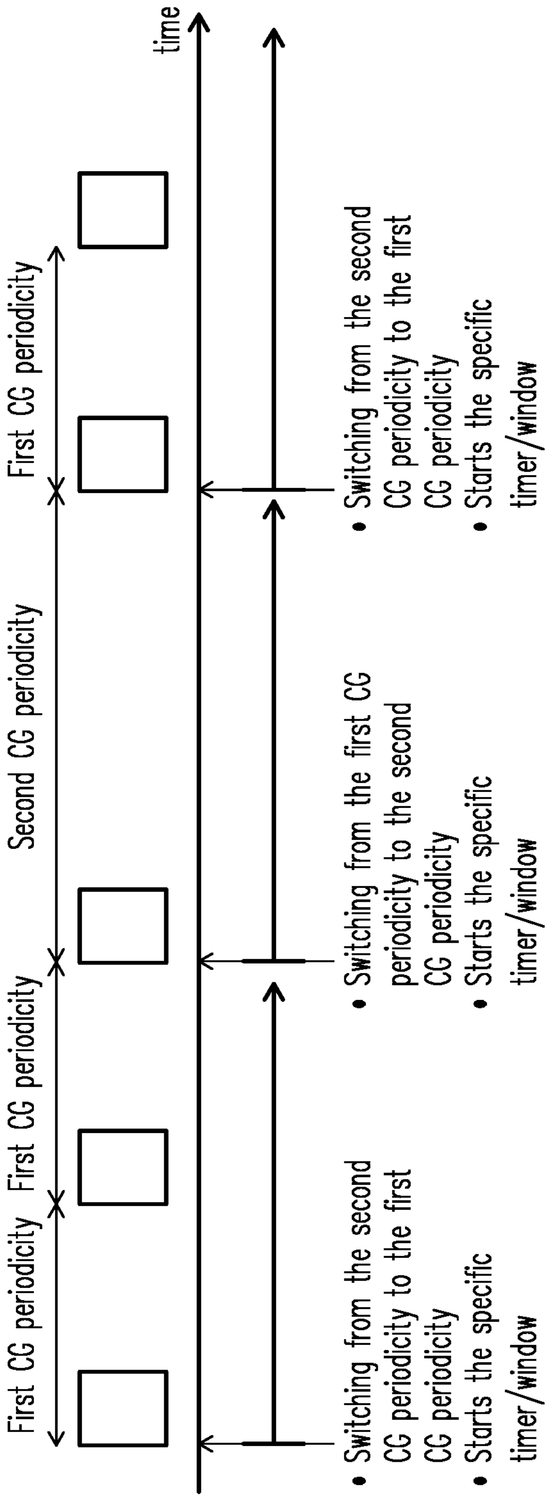
FIG. 3 is a schematic diagram illustrating a switching between parameter values within a parameter set via a specific timer and/or window, according to an example implementation of the present disclosure.

In one example, a UE may be configured with a specific timer/window and a first parameter set for a CG configuration. The first parameter set may be a periodicity for the CG configuration. The first parameter set may include two or multiple values of the corresponding parameter, e.g., a periodicity set including a first CG periodicity and a second CG periodicity. The UE may (re)start the specific timer/window upon the parameter value is switched within the first parameter set, e.g., upon the UE switches from the first CG periodicity to the second CG periodicity, or vice versa. Subsequently, when the specific timer/window expires, the UE may switch to the parameter value within a parameter set before the latest parameter switching was performed. The present example may be illustrated in FIG. 3. Upon the UE switches from the second CG periodicity to the first CG periodicity, the UE may start the specific timer/window. When the specific timer/window expires, the UE may switch from the first CG periodicity back to the second CG periodicity and start the specific timer/window. Similarly, when the specific timer/window expires, the UE may switch from the second CG periodicity back to the first periodicity and start the specific timer/window.

The mechanism introduced in the present example may also be applied to other PUSCH related and/or CG-related parameters as listed above, e.g., TBS, repK, configuredGrantTimer, and/or cg-RetransmissionTimer, etc.

Figure 4:
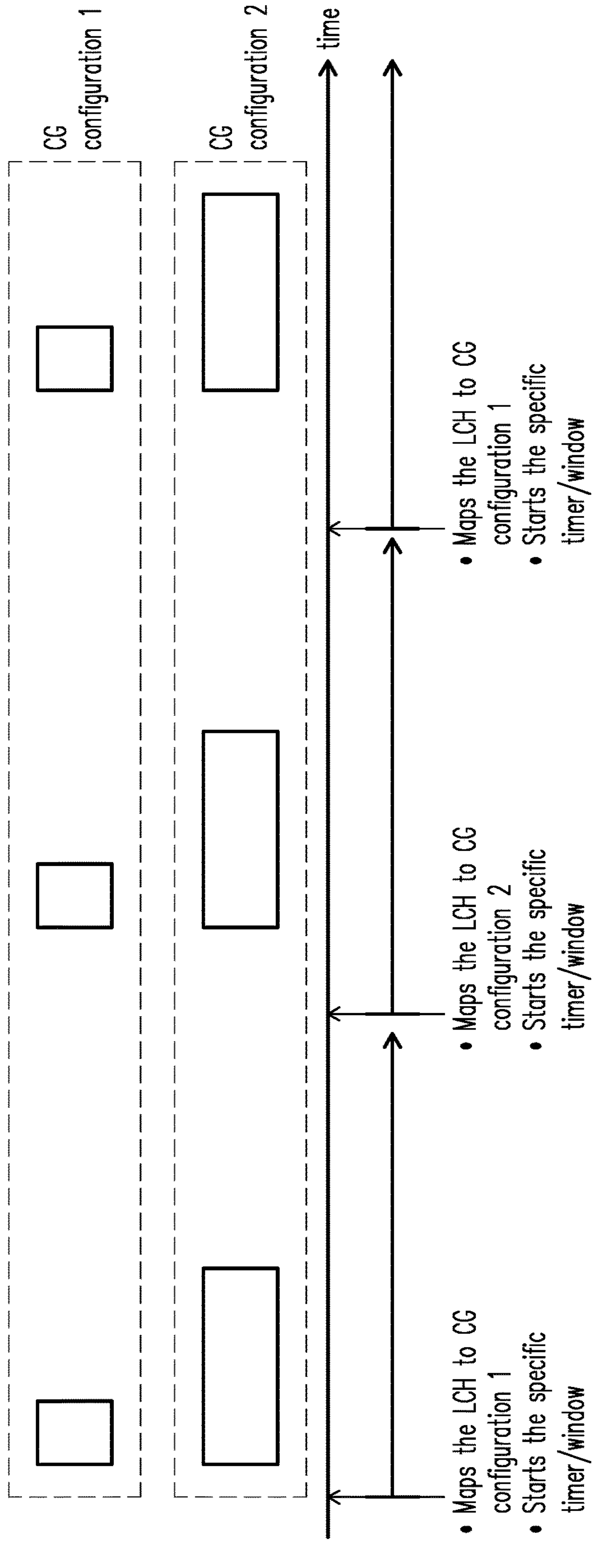
FIG. 4 is a schematic diagram illustrating a switching between parameter values within a parameter set via a specific NW indication, according to an example implementation of the present disclosure.

In one example, a UE may be configured with a first parameter set for an LCH. The first parameter set may be an allowed-CG-List set for the corresponding CG configuration. The first parameter set may include two or multiple values of the corresponding parameter, e.g., an allowed-CG-List set including a first allowed-CG-List and a second allowed-CG-List. The UE may (re)start the specific timer/window upon the parameter value is switched within the first parameter set, e.g., upon the UE switches from the first allowed-CG-List to the second allowed-CG-List, or vice versa. Subsequently, when the specific timer/window expires, the UE may switch to the parameter value within a parameter set before the latest parameter switching was performed. The present example may be illustrated in FIG. 4.

Upon the UE maps the LCH to CG configuration 1, the UE may start the specific timer/window. When the specific timer/window expires, the UE may map the LCH to the CG configuration 2 and start the specific timer/window. Similarly, when the specific timer/window expires, the UE may map the LCH to the CG configuration 1 and start the specific timer/window.

The mechanism introduced in the present example may also be applied to other LCH-related parameters as listed above, e.g., LCH priority, allowedServingCells, and/or allowedPHY-PriorityIndex, etc.

Criterion 1.4: A specific timer/window is (re)started and/or is running.

Preferably, when the specific/window is (re)started and/or is running, the UE may switch from one parameter value to another within a parameter set.

Preferably, the timer may be referred to as a timer of a DRX configuration. The timer of a DRX configuration may be a drx-onDurationTimer, drx-InactivityTimer, drx-RetransmissionTimerDL, drx-RetransmissionTimerUL, and/or drx-ShortCycleTimer, etc.

In one example, a UE may be configured with a first parameter set. The first parameter set may include (at least) a first parameter value and a second parameter value. Subsequently, when a drx-onDurationTimer is (re)started, the UE may switch the parameter value from a first parameter value to a second parameter value.

In the present example, when the drx-onDurationTimer expires, the UE may switch from the second parameter value to the first parameter value.

The mechanism introduced in the present example may enable switching of parameter values of a parameter set based on the DRX ON/OFF period.

Criterion 1.5: A specific timer/window is not running.

Preferably, the specific timer/window may be configured to prohibit frequent switching of the parameter values within the parameter set configured to a UE.

Preferably, when the other one or multiple switching criteria has been satisfied, the UE may determine whether to perform the parameter value switching within a parameter set based on whether the specific timer/window is running.

Preferably, while the timer/window is running, the UE may be prohibited to switch from one parameter value to another within a parameter set when the other one or multiple switching criteria have been satisfied.

Preferably, while the timer/window is not running, the UE may switch from one parameter value to another within a parameter set when the other one or multiple switching criteria have been satisfied.

Criterion 1.6: The DL channel quality (in RSRP/reference signal receiving quality (RSRQ)/signal to interference plus noise ratio (SINR)) becomes higher/lower than a DL channel quality threshold.

Preferably, the DL channel quality threshold may be a RSRP threshold, RSRQ threshold, and/or SINR threshold, etc.

Preferably, the UE may perform measurement of a configured SSB and/or CSI-RS in order to obtain the DL channel quality.

Preferably, one or multiple DL channel quality threshold may be configured at a UE. Each DL quality threshold may be mapped to a parameter value within a parameter set. As such, the UE may switch to the parameter value that maps to the DL channel quality when the measured DL channel quality (in RSRP/RSRQ/SINR) becomes higher/lower than the corresponding DL channel quality threshold.

Criterion 1.7: Specific UL data becomes available for transmission.

Preferably, the specific UL data may come from an LCH/LCG that is explicitly configured by the NW.

In one example, the LCH may be used to convey XR traffic.

In one example, the LCH/LCG may have a specific LCH/LCG ID.

Preferably, the UE may determine the specific UL data become available when a buffer status report (BSR)/SR is triggered by the LCH where the specific UL data comes from.

In one example, a UE may be configured with a first parameter set. The first parameter set may include (at least) a first parameter value and a second parameter value. Subsequently, when specific UL data becomes available for transmission, the UE may switch the parameter value from the first parameter value to the second parameter value.

Criterion 1.8: Upon a DL assignment and/or DL data reception.

Preferably, the DL assignment may be monitored on a PDCCH addressed to a specific RNTI.

The specific RNTI may be mapped to one or more XR services.

The specific RNTI may be configured via the specific DRX configuration and/or a configuration for XR.

The specific RNTI may be configured to the UE via RRC signaling.

The specific RNTI may be associated with a DCI to schedule DL resource (e.g., PDSCH) and/or UL resource (e.g., PUSCH) including XR services.

The specific RNTI may be associated with a DCI to preempt other UL/DL traffics.

Preferably, the DL assignment may be received on a specific PDCCH/CORESET/SS.

In one example, the specific PDCCH/CORESET/SS may be explicitly configured by the NW for transmitting scheduling information (e.g., DCI for DL assignment and/or UL grant) that schedules UL/DL resources for carrying XR traffics/services.

Preferably, the DL assignment may correspond to a specific HARQ process ID.

In one example, PDSCHs corresponding to a specific HARQ process ID may be mapped to a specific LCH/LCG. Here, the LCHs with the specific LCH/LCG ID may be used to convey XR traffics/services.

Preferably, the DL assignment may be used to schedule a DL data for initial transmission or retransmission.

Preferably, the DL data may come from an LCH/LCG that is explicitly configured by the NW.

In one example, the LCH may be explicitly configured by the NW to convey XR traffic/services.

In one example, the LCH/LCG may have a specific LCH/LCG ID. Here, the LCHs with the specific LCH/LCG ID may be used to convey XR traffics/services.

Preferably, the DL data may be received on a PDSCH scheduled by a DL assignment or a PDSCH that corresponds to a SPS. Moreover, the PDSCH may be specifically used for transmitting XR traffics.

In one example, the PDSCH may satisfy the LCP mapping restriction(s) configured to an LCH/LCG that is explicitly configured by the NW (as mentioned above).

In one example, the PDSCH may include data of an LCH/LCG that is explicitly configured by the NW (as mentioned above).

In one example, a UE may be configured with a first parameter set. The first parameter set may include (at least) a first parameter value and a second parameter value. Subsequently, the UE may, upon reception of a DL assignment and/or DL data, switch the parameter value from the first parameter value to the second parameter value.

In the present example, the DL assignment may be received on a specific PDCCH/CORESET/SS. The specific PDCCH/CORESET/SS may be explicitly configured by the NW for transmitting scheduling information (e.g., DCI for DL assignment and/or UL grant) that schedules DL resources for carrying XR traffics/services.

In the present example, the DL data may come from an LCH/LCG that is explicitly configured by the NW to convey XR traffic/services.

Criterion 1.9: Upon the UE enters/leaves DRX Active time.

Preferably, the UE may enter DRX Active time when at least one of drx-onDurationTimer, drx-InactivityTimer, drx-RetransmissionTimerDL, drx-RetransmissionTimerUL, ra-ContentionResolutionTimer, and/or msgB-ResponseWindow, etc., is running.

Preferably, the UE may enter DRX Active time when a SR is sent on PUCCH and is pending.

Preferably, the UE may enter DRX Active time when PDCCH indicating a new transmission addressed to a C-RNTI of the UE has not been received after successful reception of a RAR for the RA Preamble not selected by the UE among the CBRA preambles.

Preferably, the UE may leave DRX Active time when none of the conditions to enter DRX Active time is satisfied.

Preferably, the UE may switch the parameter value of a parameter set upon entering/leaving DRX Active time for a DRX group if the parameter set is configured in the same serving cell as where the DRX group is configured.

In one example, a UE may be configured with a first parameter set. The first parameter set may include (at least) a first parameter value and a second parameter value. Subsequently, the UE may, upon entering/leaving DRX active time, switch the parameter value from the first parameter value to the second parameter value.

Criterion 1.10: Upon/after the UE transmits a specific information to BS.

More specifically, the specific information may be feedback (e.g., ACK/negative-acknowledgment (NACK) on PUCCH). The feedback may be transmitted in response to the specific switching indication.

More specifically, the specific information may be transmitted via an assistance information/UEAssistanceInformation IE (e.g., the assistance information for XR, for CG-related parameters, for PUSCH-related parameters, and/or for LCH-related parameters, etc.).

More specifically, the specific information may be transmitted via a UE capability information/UECapabilityInformation IE (e.g., the UE capability information for XR, for CG-related parameters, for PUSCH-related parameters, and/or for LCH-related parameters, etc.).

More specifically, the specific information may indicate that an information for XR traffic pattern/XR application/frame per second/periodicity for DRX/pose control information.

More specifically, the specific information may be transmitted via an RRC message, a MAC CE (e.g., a SR, a BSR, and/or a XR MAC CE), and/or a PHY signaling (e.g., on PUCCH).

Criterion 1.11: The UE is performing a procedure for XR.

More specifically, the UE may enter/initiate/perform a procedure for XR when data arrives at a specific LCH/SRB/DRB for XR services and/or when the UE has pending data from the specific LCH/SRB/DRB for XR services. The specific LCH/SRB/DRB configuration for XR services may be configured by the NW for conveying XR data.

More specifically, the UE may enter/initiate/perform a procedure for XR when the UE triggers/initiates a BSR/SR/RA from a specific LCH/SRB/DRB for XR services.

More specifically, the UE may enter/initiate/perform a procedure for XR when the UE receives a scheduling information that schedules a UL/DL resource for transmitting UL/DL XR traffics. Alternatively, the UE may enter/initiate/perform a procedure for XR when the UE (successfully/unsuccessfully) receives on a DL resource (e.g., PDSCH) and/or transmits on a UL resource (e.g., PUSCH) including XR traffics.

More specifically, the UE may enter/initiate/perform a procedure for XR when the UE receives a specific indication from the BS. The specific indication may indicate the UE to enter/initiate/perform a procedure for XR. The indication may be transmitted via an RRC message, a MAC CE (e.g., a XR MAC CE), and/or a PHY signaling (e.g., on PDCCH).

Criterion 1.12: The UE operates on a specific DRX cycle (or a preconfigured DRX cycle).

Preferably, the specific DRX cycle may be referred to as a long DRX cycle, short DRX cycle, and/or a non-integer DRX cycle.

Specifically, the non-integer DRX cycle may be configured by the UE via a non-integer DRX configuration. The non-integer DRX configuration may be configured independently from the legacy DRX configuration. The values of the DRX timers (e.g., drx-onDurationTimer, drx-InactivityTimer, drx-HARQ-RTT-TimerDL, drx-HARQ-RTT-TimerUL, drx-RetransmissionTimerDL, drx-RetransmissionTimerUL, and/or drx-ShortCycleTimer, etc.) from the non-integer DRX configuration may be configured as non-integer values. The UE may apply the non-integer DRX cycle upon being configured with a non-integer DRX configuration.

Preferably, the UE may perform switching of parameter value within a parameter set based on the DRX cycle that the UE currently operates on.

Preferably, a mapping between the parameter value within a parameter set and the specific DRX cycle may be configured to the UE. Based on the mapping, the UE may determine which parameter value within the parameter set to be used based on the specific DRX cycle that the UE currently operates on.

In one example, when a UE operates on a first DRX cycle (e.g., one of long, short, or non-integer DRX cycle), the UE may apply a parameter value within a parameter set. Subsequently, when the UE switches to a second DRX cycle (e.g., one of long, short, or non-integer DRX cycle) that is different from the first DRX cycle, the UE may switch the parameter value within the parameter set.

To improve the UL resource (e.g., PUSCH) scheduling/configuration flexibility, new criteria to activate, deactivate, suspend, release, and/or (re)initialize a CG configuration may be introduced. The CG configuration may be activated and/or (re)initialized for transmission only when the new criteria are satisfied. Alternatively, the CG configuration may be deactivated and/or suspended and/or release when the new criteria are satisfied.

The UE may select one of multiple parameter values in a parameter set(s) when one or multiple switching criteria (or trigger events) are satisfied. The UE may determine one or more uplink resources according to the selected value and may transmit pending uplink data via the uplink resource after the uplink resource are determined. In one implementation, the UE may select a parameter value from the multiple parameter values of the parameter set by activating/deactivating/releasing/(re)initializing the parameter value configured to the UE.

In one implementation, a UE may be configured with a type 2 CG configuration. The type 2 CG configuration may be activated/deactivated/release when at least one criterion from criterion 2.1 through criterion 2.10 mentioned below is satisfied.

Preferably, when the type 2 CG configuration is activated/deactivated/released, the UE may send a notification to the NW. As such, the NW may be informed about the activation/deactivation/release status of the type 2 CG configuration.

Specifically, the notification may be indicated via a DCI or a MAC CE. In one example, the notification may be referred to as a CG confirmation MAC CE. The MAC entity/UE may trigger a CG confirmation when the type 2 CG configuration is activated/deactivated/released.

Specifically, the notification may be a bitmap. Each bit of the bitmap may correspond to a (group of) type 2 CG configuration. A bit in the bitmap may be set to a first value for indicating that the (group of) type 2 CG configuration, which corresponds to the bit, has been activated. In contrast, a bit in the bitmap may be set to a second value for indicating that the (group of) type 2 CG configuration, which corresponds to the bit, has not been activated or has been deactivated/released.

Specifically, the notification may be a bitmap. Each bit of the bitmap may correspond to a (group of) type 2 CG configuration. A bit in the bitmap may be set to a first value for indicating that the at least one criterion to activate/deactivate/release a (group of) type 2 CG configuration, which corresponds to the bit, has been satisfied. In contrast, a bit in the bitmap may be set to a second value for indicating that the at least one criterion to activate/deactivate/release a (group of) type 2 CG configuration which corresponds to the bit, has not been satisfied.

Specifically, a first bitmap may be used to indicate the activation status of CG type 1 configured to the UE, and a second bitmap (which is different from the first bitmap) may be used to indicate the deactivation/release status of CG type 1 configured to the UE.

Preferably, the UE may activate/deactivate/release the type 2 CG configuration only if the type 2 CG configuration has at least one of the following characteristics: the type 2 CG configuration is explicitly indicated by the NW (via a specific indication); or the type 2 CG configuration can be mapped to a specific UL data. The specific UL data may come from an LCH/LCG that is explicitly configured by the NW.

In one example, the LCH may be used to convey XR traffic.

In one example, the LCH/LCG may have a specific LCH/LCG ID.

In one implementation, a UE may be configured with a type 1 CG configuration. The type 1 CG configuration may be (re-)initialized/suspended/release when at least one criterion from criterion 2.1 through criterion 2.10 mentioned below is satisfied.

Preferably, when the type 1 CG configuration is (re-)initialized/suspended/released, the UE may send a notification to the NW. As such, the NW may be informed about the (re-)initialization/suspension/release status of the type 1 CG configuration.

Specifically, the notification may be indicated via a DCI or a MAC CE. In one example, the notification may be referred to as a CG confirmation MAC CE. The MAC entity UE may trigger a CG confirmation when the type 1 CG configuration is (re-)initialized/suspended/released.

Specifically, the notification may be a bitmap. Each bit of the bitmap may correspond to a (group of) type 1 CG configuration. A bit in the bitmap may be set to a first value for indicating that the (group of) type 1 CG configuration, which corresponds to the bit, has been (re-)initialized. In contrast, a bit in the bitmap may be set to a second value for indicating that the (group of) type 1 CG configuration, which corresponds to the bit, has not been (re-)initialized or has been suspended/released.

Specifically, the notification may be a bitmap. Each bit of the bitmap may correspond to a (group of) type 1 CG configuration. A bit in the bitmap may be set to a first value for indicating that the at least one criterion to (re-)initialize/suspend/release a (group of) type 1 CG configuration, which corresponds to the bit, has been satisfied. In contrast, a bit in the bitmap may be set to a second value for indicating that the at least one criterion to (re-)initialize/suspend/release a (group of) type 1 CG configuration which corresponds to the bit, has not been satisfied.

Specifically, the notification may be a bitmap. Moreover, the bitmap may indicate the activation/deactivation/(re-)initialization/suspension/release status of both CG type 1 and CG type 2 configured to the UE.

Specifically, a first bitmap may be used to indicate the (re-)initialization/suspension/release status of CG type 1 configured to the UE, and a second bitmap (which is different from the first bitmap) may be used to indicate the activation/deactivation/release status of CG type 2 configured to the UE.

Specifically, a first bitmap may be used to indicate the (re-)initialization status of CG type 1 configured to the UE, and a second bitmap (which is different from the first bitmap) may be used to indicate the suspension/release status of CG type 1 configured to the UE.

Preferably, the UE may (re-)initialize/suspend/release the type 1 CG configuration only if the type 1 CG configuration has at least one of the following characteristics: the type 1 CG configuration is explicitly indicated by the NW (via a specific indication); or the type 1 CG configuration can be mapped to a specific UL data. The specific UL data may come from an LCH/LCG that is explicitly configured by the NW.

In one example, the LCH may be used to convey XR traffic.

In one example, the LCH/LCG may have a specific LCH/LCG ID.

Criterion 2.1: The UE receives a specific indication from the NW.

Preferably, the specific indication may indicate the UE to activate/deactivate/release a (group of) type 2 CG configuration and/or (re-)initialize/suspend/release a (group of) type 1 CG configuration.

Preferably, the specific indication may have various format alternatives.

The specific indication may be included in a DCI, a MAC CE, and/or an RRC message, etc.

The specific indication may be a specific MAC CE, a DCI with a specific DCI format, and/or a specific RRC message, etc.

The specific indication may be received on a specific PDCCH/CORESET/SS. In one example, the specific PDCCH/CORESET/SS may be explicitly configured by the NW for transmitting scheduling information (e.g., DCI for DL assignment and/or UL grant) that schedules UL/DL resources for carrying XR traffics/services.

The specific indication may be a PDCCH addressed to a specific RNTI. In one example, the specific RNTI may be mapped to one or more XR services. In one example, the specific RNTI may be configured via the specific DRX configuration and/or a configuration for XR. In one example, the specific RNTI may be configured to the UE via RRC signaling. In one example, the specific RNTI may be associated with a DCI to schedule DL resource (e.g., PDSCH) and/or UL resource (e.g., PUSCH) including XR services. In one example, the specific RNTI may be associated with a DCI to preempt other UL/DL traffics. In one example, the specific RNTI may be a CS-RNTI.

Specifically, the specific indication may be a bitmap. Each bit of the bitmap may correspond to a (group of) type 2 CG configuration. A bit in the bitmap may be set to a first value for indicating that the (group of) type 2 CG configuration, which corresponds to the bit, may be activated. In contrast, a bit in the bitmap may be set to a second value for indicating that the (group of) type 2 CG configuration, which corresponds to the bit, may not be activated or may be deactivated/released.

Specifically, the specific indication may be a bitmap. Each bit of the bitmap may correspond to a (group of) type 1 CG configuration. A bit in the bitmap may be set to a first value for indicating that the (group of) type 1 CG configuration, which corresponds to the bit, may be (re-)initialized. In contrast, a bit in the bitmap may be set to a second value for indicating that the (group of) type 1 CG configuration, which corresponds to the bit, may not be (re-)initialized or may be suspended/released.

Specifically, the specific indication may be a bitmap. Moreover, the bitmap may indicate the activation/deactivation/(re-)initialization/suspension/release of both CG type 1 and CG type 2 configured to the UE.

Specifically, a first bitmap may be used to indicate the (re-)initialization/suspension/release of CG type 1 configured to the UE, and a second bitmap (which is different from the first bitmap) may be used to indicate the activation/deactivation/release of CG type 2 configured to the UE.

Specifically, a first bitmap may be used to indicate the (re-)initialization of CG type 1 configured to the UE, and a second bitmap (which is different from the first bitmap) may be used to indicate the suspension/release of CG type 1 configured to the UE.

Specifically, a first bitmap may be used to indicate the activation of CG type 1 configured to the UE, and a second bitmap (which is different from the first bitmap) may be used to indicate the (de)activation/release of CG type 1 configured to the UE.

Preferably, the UE may start to activate/deactivate/release a type 2 CG configuration and/or (re-)initialize/suspend/release a type 1 CG configuration, which is indicated by the specific indication, at a period after the reception of the specific indication. Moreover, the period may be preconfigured in the UE or may be configured/indicated by the NW.

Preferably, the UE may start activate/deactivate/release a type 2 CG configuration and/or (re-)initialize/suspend/release a type 1 CG configuration, which is indicated by the specific indication, after sending feedback to the NW.

The feedback may be sent to the NW in response to the received specific indication.

The feedback may be an (DCI-based/MAC CE-based) ACK to inform the NW that the specific indication has been successfully received by the UE.

Preferably, the UE may activate/deactivate/release a type 2 CG configuration and/or (re-)initialize/suspend/release a type 1 CG configuration, which is indicated by the specific indication, at a specific time after the reception of the specific indication.

The specific time may be the start of the next symbol, slot, subframe, SFN, DRX cycle, and/or CG/SPS period, etc., after the reception of the specific indication.

Preferably, the UE may, upon reception of the specific indication, send feedback to the NW in response to the received specific indication. The feedback may be used to indicate that the specific indication has been successfully (or unsuccessfully) received by the UE.

Preferably, the specific indication may indicate the UE to activate/deactivate/release a type 2 CG configuration and/or (re-)initialize/suspend/release a type 1 CG configuration on one or multiple BWPs/(set of) serving cells. Preferably, the specific indication may indicate the UE to activate/deactivate/release a type 2 CG configuration and/or (re-)initialize/suspend/release a type 1 CG configuration that is configured in a different serving cell from the serving cell where the specific switching indication is received.

Criterion 2.2: When the amount of pending UL data becomes larger/smaller than a data volume threshold.

Preferably, the type 2 CG configuration may be activated (or deactivated) when the amount of pending UL data becomes larger/smaller than a data volume threshold. Preferably, the type 1 CG configuration may be (re)initialized (or suspended) when the amount of pending UL data becomes larger/smaller than a data volume threshold.

Preferably, the data volume threshold may be preconfigured at the UE and/or may be configured by the NW.

Preferably, the pending UL data may come from an LCH/LCG that is explicitly configured by the NW.

In one example, the LCH may be used to convey XR traffic.

In one example, the LCH/LCG may have a specific LCH/LCG ID.

In one example, a type 2 CG configuration may be configured to a UE. The type 2 CG configuration may be activated (or deactivated) when the amount of pending UL data becomes larger (or smaller) than a data volume threshold. In contrast, the type 2 CG configuration may be deactivated (or activated) when the amount of pending UL data becomes smaller (or larger) than a data volume threshold.

In one example, a type 1 CG configuration may be configured to a UE. The type 1 CG configuration may be (re-)initialized (or suspended) when the amount of pending UL data becomes larger (or smaller) than a data volume threshold. In contrast, the type 1 CG configuration may be suspended (or (re-)initialized) when the amount of pending UL data becomes smaller (or larger) than a data volume threshold.

Criterion 2.3: A specific timer/window expires or restarts.

Preferably, the type 2 CG configuration may be activated (or deactivated) when the specific timer/window expires or restarts. Preferably, the type 1 CG configuration may be (re-)initialized (or suspended) when the specific timer/window expires or restarts.

Preferably, the specific timer/window may be used to control whether the type 2 CG configuration may be activated (or deactivated). Preferably, the specific timer/window may be used to control whether the type 1 CG configuration may be (re-)initialized (or suspended).

Preferably, the specific timer/window may be configured per CG configuration, BWP, cell, cell group, and/or UE, etc.

Preferably, the specific timer may be stopped when at least one of the criteria from criterion 2.1 to criterion 2.10 is satisfied.

In one example, a specific timer/window may be configured to a UE. The specific timer/window may be (re)started when a type 2 CG configuration is activated/deactivated. Subsequently, the type 2 CG may be deactivated/activated when the specific timer/window expires.

In one example, a specific timer/window may be configured to a UE. The specific timer/window may be (re)started when a type 1 CG configuration is (re-)initialized/suspended. Subsequently, the type 1 CG may be suspended/(re-)initialized when the specific timer/window expires.

Criterion 2.4: The DL channel quality (in RSRP/RSRQ/SINR) becomes higher/lower than a DL channel quality threshold.

Preferably, the type 2 CG configuration may be activated (or deactivated) when the DL channel quality (in RSRP/RSRQ/SINR) becomes higher/lower than the DL channel quality threshold. Preferably, the type 1 CG configuration may be (re-)initialized (or suspended) when the DL channel quality (in RSRP/RSRQ/SINR) becomes higher/lower than the DL channel quality threshold.

Preferably, the DL channel quality threshold may be a RSRP threshold, RSRQ threshold, and/or SINR threshold, etc.

Preferably, the DL channel quality may be measured from one or more SSBs/CSI-RSs. Moreover, each of the one or more SSBs/CSI-RSs may be mapped to a (PUSCH resource of a) type 2 CG configuration.

In one alternative, when the measured DL channel quality of (all or at least one of) the one or more SSBs/CSI-RSs that maps to the type 2 CG configuration is lower than the DL channel quality threshold, the UE may deactivate (or activate) the corresponding type 2 CG configuration.

In one alternative, when the measured DL channel quality of (all or at least one of) the one or more SSBs/CSI-RSs that maps to the type 2 CG configuration is higher than the DL channel quality threshold, the UE may activate (or deactivate) the corresponding type 2 CG configuration.

Preferably, the DL channel quality may be measured from one or more SSBs/CSI-RSs. Moreover, each of the one or more SSBs/CSI-RSs may be mapped to a (PUSCH resource of a) type 1 CG configuration.

In one alternative, when the measured DL channel quality of (all or at least one of) the one or more SSBs/CSI-RSs that maps to the type 1 CG configuration is lower than the DL channel quality threshold, the UE may suspend (or (re-)initialize) the corresponding type 1 CG configuration.

In one alternative, when the measured DL channel quality of (all or at least one of) the one or more SSBs/CSI-RSs that maps to the type 1 CG configuration is higher than the DL channel quality threshold, the UE may (re-)initialize (or suspend) the corresponding type 1 CG configuration.

Criterion 2.5: Specific UL data becomes available for transmission (or when the UE has specific UL data that is pending for transmission).

Preferably, the type 2 CG configuration may be activated (or deactivated) when specific UL data becomes available for transmission (or when the UE has pending specific UL data for transmission). Preferably, the type 1 CG configuration may be (re-)initialized (or suspended) when specific UL data becomes available for transmission (or when the UE has pending specific UL data for transmission).

Preferably, the specific UL data may come from an LCH/LCG that is explicitly configured by the NW.

In one example, the LCH may be used to convey XR traffic.

In one example, the LCH/LCG may have a specific LCH/LCG ID.

Preferably, the specific UL data come from an LCH. Moreover, the type 2 CG configuration may satisfy the LCP mapping restriction of the LCH. In another word, the specific UL data may be referred to as the UL data that may be transmitted on the type 2 CG configuration.

Preferably, the UE may consider the specific UL data becomes available for transmission when the UE receives an UL grant indicating a PUSCH for transmitting the specific UL data. As such, the UE may further activate the type 2 CG configuration or (re-)initialize the type 1 CG configuration when receiving the UL grant (or the corresponding PUSCH). With this behavior, the UE may have more UL resource for transmitting the specific UL data.

Preferably, the specific UL data come from an LCH. Moreover, the type 2 CG configuration may satisfy the LCP mapping restriction of the LCH. In another word, the specific UL data may be referred to as the UL data that may be transmitted on the type 1 CG configuration.

In one example, a type 2 CG configuration may be configured to a UE. The type 2 CG configuration may be activated (or deactivated) when a specific UL data becomes available for transmission (or when the UE has pending specific UL data for transmission). In contrast, the type 2 CG configuration may be deactivated (or activated) when all the pending specific UL data has been transmitted.

In one example, a type 1 CG configuration may be configured to a UE. The type 1 CG configuration may be (re-)initialized (or suspended) when a specific UL data becomes available for transmission (or when the UE has pending specific UL data for transmission). In contrast, the type 2 CG configuration may be suspended (or (re-)initialized) when all the pending specific UL data has been transmitted.

Criterion 2.6: Reception of a DL assignment and/or DL data.

Preferably, the type 2 CG configuration may be activated (or deactivated) upon reception of the DL assignment and/or the DL data. Preferably, the type 1 CG configuration may be (re-)initialized (or suspended) upon reception of the DL assignment and/or the DL data.

Preferably, the DL assignment may be received on a specific PDCCH/CORESET/SS.

In one example, the specific PDCCH/CORESET/SS may be explicitly configured by the NW for transmitting scheduling information (e.g., DCI for DL assignment and/or UL grant) that schedules UL/DL resources for carrying XR traffics/services.

Preferably, the DL assignment may correspond to a specific HARQ process ID.

In one example, PDSCHs corresponding to a specific HARQ process ID may be mapped to a specific LCH/LCG. Here, the LCHs with the specific LCH/LCG ID may be used to convey XR traffics/services.

Preferably, the DL assignment may be used to schedule a DL data for initial transmission or retransmission.

Preferably, the DL data may come from an LCH/LCG that is explicitly configured by the NW.

In one example, the LCH may be explicitly configured by the NW to convey XR traffic/services.

In one example, the LCH/LCG may have a specific LCH/LCG ID. Here, the LCHs with the specific LCH/LCG ID may be used to convey XR traffics/services.

Preferably, the DL data may be received on a PDSCH scheduled by a DL assignment or a PDSCH that corresponds to a SPS. Moreover, the PDSCH may be specifically used for transmitting XR traffics.

Preferably, the DL assignment and/or DL data may be mapped to the type 1/2 CG configuration.

In one example, a type 2 CG configuration may be configured at a UE. The type 2 CG configuration may be activated (or (de)activated) when the UE receives a DL assignment and/or DL data that maps to the type 2 CG configuration.

In one example, a type 1 CG configuration may be configured at a UE. The type 1 CG configuration may be (re-)initialized (or suspended) when the UE receives a DL assignment and/or DL data that maps to the type 1 CG configuration.

Criterion 2.7: The UE enters/leaves DRX Active time.

Preferably, the type 2 CG configuration may be activated (or deactivated) upon the UE enters/leaves DRX Active time. Preferably, the type 1 CG configuration may be (re-) initialized (or suspended) upon the UE enters/leaves DRX Active time.

Criterion 2.8: Upon/after the UE transmits a specific information to BS.

In one example, a type 2 CG configuration may be configured at a UE. The type 2 CG configuration may be activated (or (de)activated) Upon/after the UE transmits a specific information to BS.

In one example, a type 1 CG configuration may be configured at a UE. The type 1 CG configuration may be (re-)initialized (or suspended) Upon/after the UE transmits a specific information to BS.

More specifically, the specific information may be feedback (e.g., ACK/NACK on PUCCH). The feedback may be transmitted in response to the specific switching indication.

More specifically, the specific information may be transmitted via an assistance information/UEAssistanceInformation IE (e.g., the assistance information for XR, for CG-related parameters, for PUSCH-related parameters, and/or for LCH-related parameters, etc.).

More specifically, the specific information may be transmitted via a UE capability information/UECapabilityInformation IE (e.g., the UE capability information for XR, for CG-related parameters, for PUSCH-related parameters, and/or for LCH-related parameters, etc.).

More specifically, the specific information may indicate that an information for XR traffic pattern/XR application/frame per second/periodicity for DRX/pose control information.

More specifically, the specific information may be transmitted via a RRC message, a MAC CE (e.g., a SR, a BSR, and/or a XR MAC CE), and/or a PHY signaling (e.g., on PUCCH).

Criterion 2.9: when the UE is performing a procedure for XR.

In one example, a type 2 CG configuration may be configured at a UE. The type 2 CG configuration may be activated (or (de)activated) when the UE is performing a procedure for XR.

In one example, a type 1 CG configuration may be configured at a UE. The type 1 CG configuration may be (re-)initialized (or suspended) when the UE is performing a procedure for XR.

More specifically, the UE may enter/initiate/perform a procedure for XR when data arrives at a specific LCH/SRB/DRB for XR services and/or when the UE has pending data from the specific LCH/SRB/DRB for XR services. The specific LCH/SRB/DRB configuration for XR services may be configured by the NW for conveying XR data.

More specifically, the UE may enter/initiate/perform a procedure for XR when the UE triggers/initiates a BSR/SR/RA from a specific LCH/SRB/DRB for XR services.

More specifically, the UE may enter/initiate/perform a procedure for XR when the UE receives a scheduling information that schedules a UL/DL resource for transmitting UL/DL XR traffics. Alternatively, the UE may enter/initiate/perform a procedure for XR when the UE (successfully/unsuccessfully) receives on a DL resource (e.g., PDSCH) and/or transmits on a UL resource (e.g., PUSCH) including XR traffics.

More specifically, the UE may enter/initiate/perform a procedure for XR when the UE receives a specific indication from the BS. The specific indication may indicate the UE to enter/initiate/perform a procedure for XR. The indication may be transmitted via an RRC message, a MAC CE (e.g., a XR MAC CE), and/or a PHY signaling (e.g., on PDCCH).

Criterion 2.10: The UE operates on a specific DRX cycle.

Preferably, the specific DRX cycle may be referred to as a long DRX cycle, short DRX cycle, and/or a non-integer DRX cycle.

Specifically, the non-integer DRX cycle may be configured by the UE via a non-integer DRX configuration. The non-integer DRX configuration may be configured independently from the legacy DRX configuration. The values of the DRX timers (e.g., drx-onDurationTimer, drx-InactivityTimer, drx-HARQ-RTT-TimerDL, drx-HARQ-RTT-TimerUL, drx-RetransmissionTimerDL, drx-RetransmissionTimerUL, and/or drx-ShortCycleTimer, etc.) from the non-integer DRX configuration may be configured as non-integer values. The UE may apply the non-integer DRX cycle upon being configured with a non-integer DRX configuration.

Preferably, the UE may perform activate/deactivate/(re-)initialize/suspend/release a CG configuration based on the DRX cycle that the UE currently operates on.

Preferably, the mapping between the activation/deactivation/release status of a type 2 CG configuration and the specific DRX cycle may be configured to the UE. Based on the mapping, the UE may determine whether to activate/deactivate/release the type 2 CG configuration based on which type of DRX cycle that the UE currently operates on.

Preferably, the mapping between the (re-)initialization/suspension/release status of a type 1 CG configuration and the specific DRX cycle may be configured to the UE. Based on the mapping, the UE may determine whether to (re-)

initialize/suspend/release the type 1 CG configuration based on which type of DRX cycle that the UE currently operates on.

In one example, when a UE operates on a first DRX cycle (e.g., one of long, short, or non-integer DRX cycle), the UE may activate a type 2 CG configuration. Subsequently, when the UE switches to a second DRX cycle (e.g., one of long, short, or non-integer DRX cycle) that is different from the first DRX cycle, the UE may deactivate/release the type 2 CG configuration.

In one example, when a UE operates on a first DRX cycle (e.g., one of long, short, or non-integer DRX cycle), the UE may (re-)initialize a type 1 CG configuration. Subsequently, when the UE switches to a second DRX cycle (e.g., one of long, short, or non-integer DRX cycle) that is different from the first DRX cycle, the UE may suspend/release the type 2 CG configuration.

To improve the system capacity and to better utilize the configured BWP and serving cell, some new criteria to perform BWP switching and/or serving cell activation/deactivation may be introduced. The UE may perform BWP switching and/or serving cell activation/deactivation only when the new criteria are satisfied. Based on the introduced criteria, the UE may switch between its configured BWPs and/or perform serving cell activation/deactivation.

The UE may select one of multiple parameter values in a parameter set(s) when one or multiple switching criteria (or trigger events) are satisfied. The UE may determine one or more uplink resources according to the selected value and may transmit pending uplink data via the uplink resource after the uplink resource are determined. In one implementation, the UE may select a parameter value from the multiple parameter values of the parameter set by switching from a BWP to another BWP or by activating/deactivating a serving cell configured to the UE.

In one implementation, a UE may be configured with more than one BWP in a serving cell. The UE may switch from its current active BWP in the serving cell to another BWP in the serving cell when at least one criterion from criterion 3.1 through criterion 3.3 is satisfied.

Preferably, the UE may switch from its active BWP to another BWP in the same serving cell only if the UE's active BWP and/or the other BWP has at least one of the following characteristics: the active BWP and/or the other BWP is explicitly indicated by the NW (via a specific indication); or the active BWP and/or the other BWP is configured with at least one CG configuration. Moreover, the at least one CG configuration may be mapped to a specific UL data. The specific UL data may come from an LCH/LCG that is explicitly configured by the NW.

In one example, the LCH may be used to convey XR traffic.

In one example, the LCH/LCG may have a specific LCH/LCG ID.

In one implementation, a UE may be configured with a serving cell. The UE may activate the serving cell, which is currently deactivated, when at least one criterion from criterion 3.1 through criterion 3.3 is satisfied. Alternatively, the UE may deactivate the serving cell, which is currently activated, when at least one criterion from criterion 3.1 through criterion 3.3 is satisfied.

Preferably, the UE may activate or deactivate the configured serving cell only if the configured serving cell has at least one of the following characteristics: the configured serving cell is explicitly indicated by the NW (via a specific indication); or the configured serving cell is configured with at least one CG configuration. Moreover, the at least one CG configuration may be mapped to a specific UL data. The specific UL data may come from an LCH/LCG that is explicitly configured by the NW.

In one example, the LCH may be used to convey XR traffic.

In one example, the LCH/LCG may have a specific LCH/LCG ID.

The configured serving cell can be mapped to a specific UL data (as mentioned above). In another word, the specific UL data can be transmitted on the configured serving cell if it is mapped to the configured serving cell.

Criterion 3.1: When the amount of pending UL data becomes larger than a data volume threshold.

Preferably, the UE may perform BWP switching when the amount of pending UL data becomes larger than a data volume threshold.

The BWP switching may involve switching to a BWP that can be used for transmitting the pending UL data. In one alternative, the BWP may be configured with at least one CG configuration that can be used for transmitting the pending UL data. That is to say, the at least one CG configuration may satisfy the LCP mapping restriction of the LCH where the pending UL data comes from.

Preferably, the UE may activate a serving cell when the amount of pending UL data becomes larger than a data volume threshold.

The UE may activate a serving cell that can be used for transmitting the pending UL data. In one alternative, the serving cell may be configured with at least one CG configuration that can be used for transmitting the pending UL data. That is to say, the at least one CG configuration may satisfy the LCP mapping restriction of the LCH where the pending UL data comes from. In one alternative, the serving cell may satisfy the LCP mapping restriction of the LCH where the pending UL data comes from.

Preferably, the data volume threshold may be preconfigured at the UE and/or may be configured by the NW.

Preferably, the pending UL data may come from an LCH/LCG that is explicitly configured by the NW.

In one example, the LCH may be used to convey XR traffic.

In one example, the LCH/LCG may have a specific LCH/LCG ID.

Criterion 3.2: Specific UL data becomes available for transmission (or when the UE has specific UL data that is pending for transmission).

Preferably, the UE may perform BWP switching when specific UL data becomes available for transmission.

The BWP switching may involve switching to a BWP that can be used for transmitting the specific UL data. In one alternative, the BWP may be configured with at least one CG configuration that can be used for transmitting the specific UL data. That is to say, the at least one CG configuration may satisfy the LCP mapping restriction of the LCH where the specific UL data comes from.

Preferably, the UE may activate a serving cell when specific UL data becomes available for transmission.

The UE may activate a serving cell that can be used for transmitting the specific UL data. In one alternative, the serving cell may be configured with at least one CG configuration that can be used for transmitting the specific UL data. That is to say, the at least one CG configuration may satisfy the LCP mapping restriction of the LCH where the specific UL data comes from. In one alternative, the serving cell may satisfy the LCP mapping restriction of the LCH where the specific UL data comes from.

Preferably, the specific UL data may come from an LCH/LCG that is explicitly configured by the NW.

In one example, the LCH may be used to convey XR traffic.

In one example, the LCH/LCG may have a specific LCH/LCG ID.

Criterion 3.3: Reception of a DL assignment and/or DL data.

Preferably, the UE may perform BWP switching upon reception of the DL assignment and/or the DL data.

The BWP switching may involve switching to a BWP that can be used for transmitting specific UL data. In one alternative, the BWP may be configured with at least one CG configuration that can be used for transmitting the specific UL data. That is to say, the at least one CG configuration may satisfy the LCP mapping restriction of the LCH where the specific UL data comes from. Here, the specific UL data may be referred to as XR data.

Preferably, the DL assignment may be received on a specific PDCCH/CORESET/SS.

In one example, the specific PDCCH/CORESET/SS may be explicitly configured by the NW for transmitting scheduling information (e.g., DCI for DL assignment and/or UL grant) that schedules UL/DL resources for carrying XR traffics/services.

Preferably, the DL assignment may correspond to a specific HARQ process ID.

In one example, PDSCHs corresponding to a specific HARQ process ID may be mapped to a specific LCH/LCG. Here, the LCHs with the specific LCH/LCG ID may be used to convey XR traffics/services.

Preferably, the DL assignment may be used to schedule a DL data for initial transmission or retransmission.

Preferably, the DL data may come from an LCH/LCG that is explicitly configured by the NW.

In one example, the LCH may be explicitly configured by the NW to convey XR traffic/services.

In one example, the LCH/LCG may have a specific LCH/LCG ID. Here, the LCHs with the specific LCH/LCG ID may be used to convey XR traffics/services.

Preferably, the DL data may be received on a PDSCH scheduled by a DL assignment or a PDSCH that corresponds to a SPS. Moreover, the PDSCH may be specifically used for transmitting XR traffics.

Preferably, the DL assignment and/or DL data may be mapped to the type 1/2 CG configuration.

Figure 5:
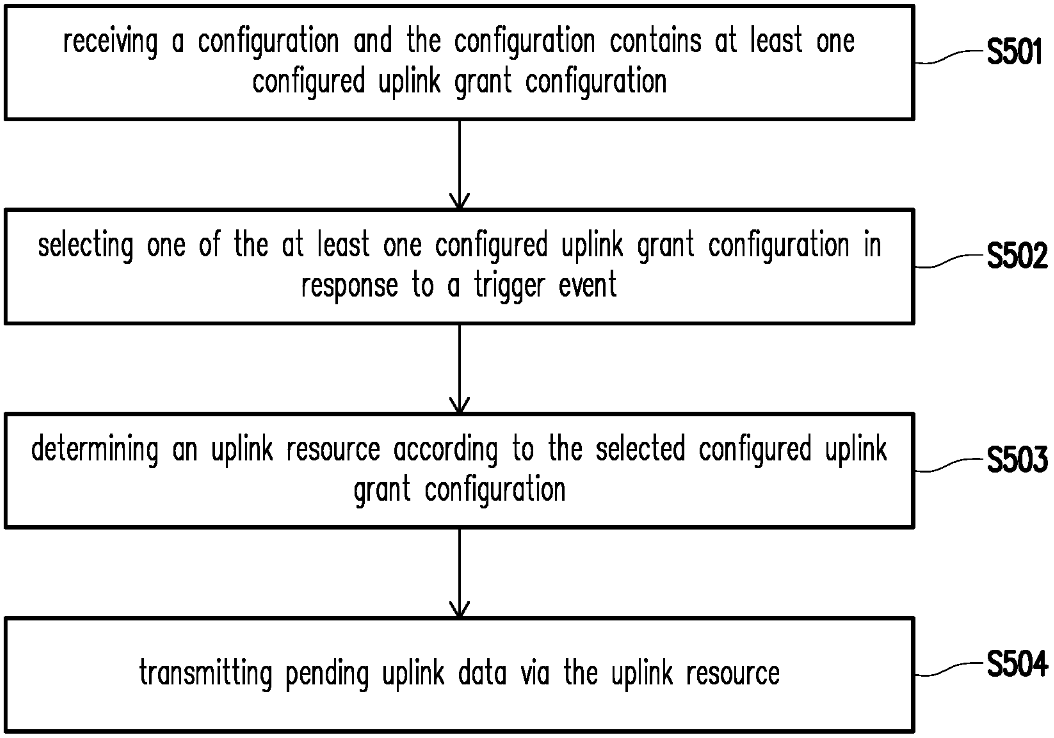
FIG. 5 is a flowchart illustrating a method of uplink resource allocation, according to an example implementation of the present disclosure.

FIG. 5 is a flowchart illustrating a method of uplink resource allocation, according to an example implementation of the present disclosure, wherein the method may be performed by a UE. In step S501, receiving a configuration and the configuration contains at least one configured uplink grant configuration. In step S502, selecting one of the at least one configured uplink grant configuration in response to a trigger event. In step S503, determining an uplink resource according to the selected configured uplink grant configuration. In step S504, transmitting pending uplink data via the uplink resource.

Figure 6:
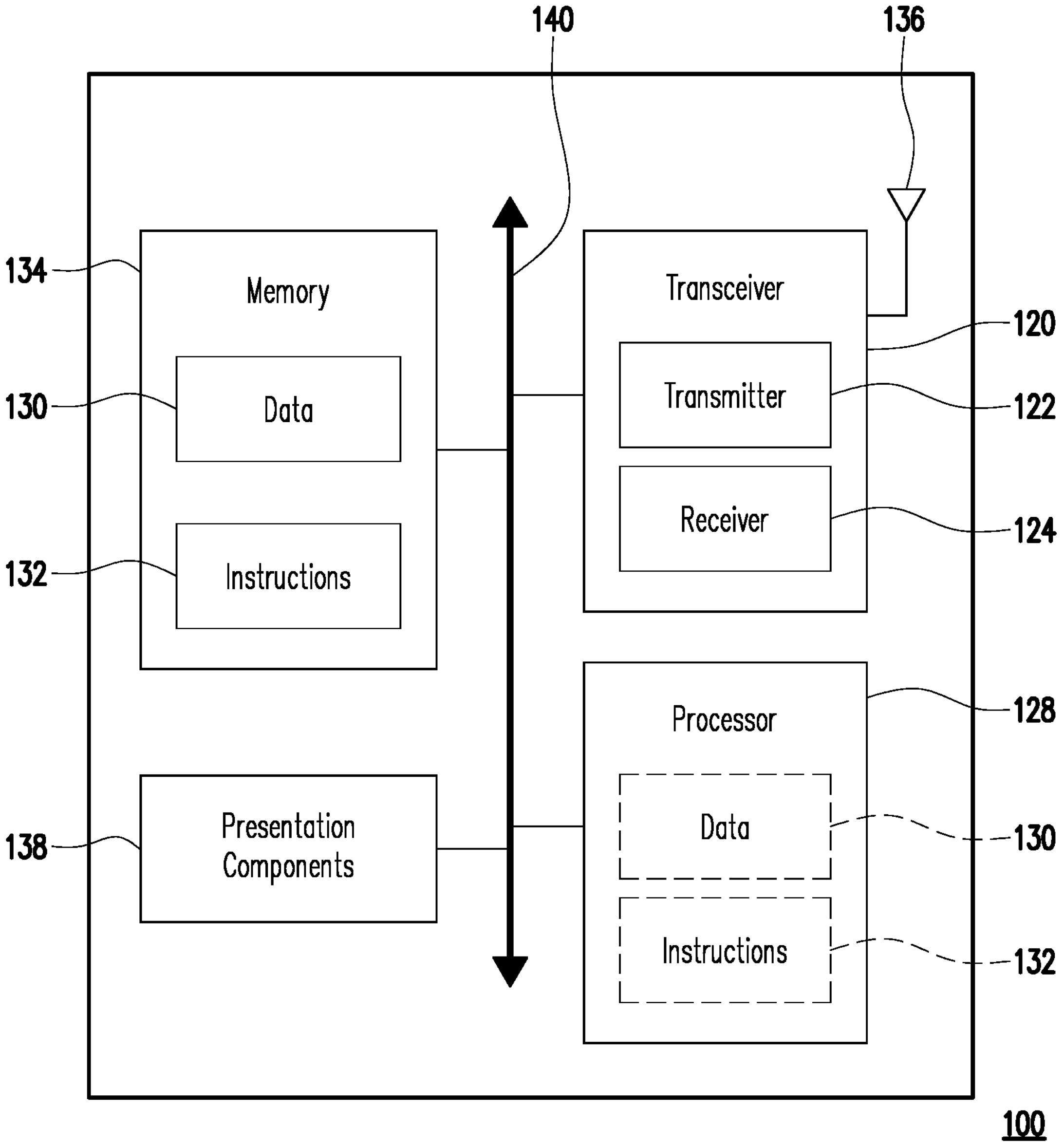
FIG. 6 is a block diagram illustrating a node for wireless communication, according to an example implementation of the present disclosure.

FIG. 6 is a block diagram illustrating a node for wireless communication, according to an example implementation of the present disclosure. As shown in FIG. 6, a node 100 may include a transceiver 120, a processor 128, a memory 134, one or more presentation components 138, and at least one antenna 136. The node 100 may also include an RF spectrum band module, a base station communications module, a network communications module, and a system communications management module, Input/Output (I/O) ports, I/O components, and power supply (not explicitly shown in FIG. 6). Each of these components may be in communication with each other, directly or indirectly, over one or more buses 140. In one implementation, the node 100 may be a UE or a base station that performs various functions described herein, for example, with reference to FIGS. 1 through 5.

The transceiver 120 having a transmitter 122 (e.g., transmitting/transmission circuitry) and a receiver 124 (e.g., receiving/reception circuitry) may be configured to transmit and/or receive time and/or frequency resource partitioning information. In some implementations, the transceiver 120 may be configured to transmit in different types of subframes and slots including, but not limited to, usable, non-usable and flexibly usable subframes and slot formats. The transceiver 120 may be configured to receive data and control channels.

The node 100 may include a variety of computer-readable media. Computer-readable media can be any available media that can be accessed by the node 100 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable.

Computer storage media includes RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 134 may include computer-storage media in the form of volatile and/or non-volatile memory. The memory 134 may be removable, non-removable, or a combination thereof. Exemplary memory includes solid-state memory, hard drives, optical-disc drives, and etc. As illustrated in FIG. 6, the memory 134 may store computer-readable, computer-executable instructions 132 (e.g., software codes) that are configured to, when executed, cause the processor 128 to perform various functions described herein, for example, with reference to FIGS. 1 through 5. Alternatively, the instructions 132 may not be directly executable by the processor 128 but be configured to cause the node 100 (e.g., when compiled and executed) to perform various functions described herein.

The processor 128 (e.g., having processing circuitry) may include an intelligent hardware device, e.g., a Central Processing Unit (CPU), a microcontroller, an ASIC, and etc. The processor 128 may include memory. The processor 128 may process the data 130 and the instructions 132 received from the memory 134, and information through the transceiver 120, the base band communications module, and/or the network communications module. The processor 128 may also process information to be sent to the transceiver 120 for transmission through the antenna 136, to the network communications module for transmission to a core network.

One or more presentation components 138 presents data indications to a person or other device. Exemplary presentation components 138 include a display device, speaker, printing component, vibrating component, and etc.

From the above description, it is manifested that various techniques may be used for implementing the concepts described in the present application without departing from the scope of those concepts. Moreover, while the concepts have been described with specific reference to certain implementations, a person of ordinary skill in the art would recognize that changes may be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method performed by a user equipment (UE) for uplink resource allocation, the method comprising:

receiving, from a base station (BS), a configured uplink grant configuration comprising a first set of parameters and a second set of parameters;

activating the configured uplink grant configuration;

applying the first set of parameters in the configured uplink grant configuration;

determining a first uplink resource based on the configured uplink grant configuration and the first set of parameters;

transmitting, to the BS, pending uplink data on the first uplink resource, wherein the pending uplink data is received from a specific Logical Channel (LCH); and in response to determining that an amount of the pending uplink data is greater than a threshold configured for the specific LCH:

transmitting, to the BS, a notification indicating that the amount of the pending uplink data exceeds the threshold, receiving, from the BS, an acknowledgment in response to the notification, in response to receiving the acknowledgment, stopping applying the first set of parameters and applying the second set of parameters in the configured uplink grant configuration, determining a second uplink resource based on the configured uplink grant configuration and the second set of parameters, and transmitting the pending uplink data on the second uplink resource.

2. The method of claim 1, wherein the amount of the pending uplink data being greater than the threshold is determined as a trigger event, wherein the trigger event further comprises:

receiving a switching indication from a network.

3. The method of claim 1, wherein the amount of the pending uplink data being greater than the threshold is determined as a trigger event, wherein the trigger event further comprises:

a timer expiring.

4. The method of claim 1, wherein the amount of the pending uplink data being greater than the threshold is determined as a trigger event, wherein the trigger event further comprises at least one of:

a timer being started, the timer being restarted, or the timer being running.

5. The method of claim 1, wherein the amount of the pending uplink data being greater than the threshold is determined as a trigger event, wherein the trigger event further comprises:

a timer not being running.

6. The method of claim 1, wherein the amount of the pending uplink data being greater than the threshold is determined as a trigger event, wherein the trigger event further comprises:

a downlink channel quality measured by the UE being greater than a second threshold.

7. The method of claim 1, wherein the amount of the pending uplink data being greater than the threshold is determined as a trigger event, wherein the trigger event further comprises:

receiving a downlink assignment.

8. The method of claim 1, wherein the amount of the pending uplink data being greater than the threshold is determined as a trigger event, wherein the trigger event further comprises at least one of:

entering a discontinuous reception (DRX) active time, or leaving the DRX active time by the UE.

9. The method of claim 1, wherein the amount of the pending uplink data being greater than the threshold is determined as a trigger event, wherein the trigger event further comprises:

transmitting information to the BS.

10. The method of claim 1, wherein the amount of the pending uplink data being greater than the threshold is determined as a trigger event, wherein the trigger event further comprises:

performing a procedure for an extended reality (XR) service.

11. The method of claim 1, wherein the amount of the pending uplink data being greater than the threshold is determined as a trigger event, wherein the trigger event further comprises:

the UE operating on a preconfigured discontinuous reception (DRX) cycle.

12. A user equipment (UE), the UE comprising:

at least one processor; and at least one non-transitory computer-readable medium coupled to the at least one processor and storing one or more computer-executable instructions that, when executed by the at least one processor, cause the UE to:

receive, from a base station (BS), a configured uplink grant configuration comprising a first set of parameters and a second set of parameters;

activate the configured uplink grant configuration;

apply the first set of parameters in the configured uplink grant configuration;

determine a first uplink resource based on the configured uplink grant configuration and the first set of parameters;

transmit, to the BS, pending uplink data on the first uplink resource, wherein the pending uplink data is received from a specific Logical Channel (LCH); and in response to determining that an amount of the pending uplink data is greater than a threshold configured for the specific LCH:

transmit, to the BS, a notification indicating that the amount of the pending uplink data exceeds the threshold, receive, from the BS, an acknowledgment in response to the notification, in response to receiving the acknowledgment, stop applying the first set of parameters and apply the second set of parameters in the configured uplink grant configuration, determine a second uplink resource based on the configured uplink grant configuration and the second set of parameters, and transmit the pending uplink data on the second uplink resource.

* * * * *